(12) United States Patent
Ashkenazy et al.

(10) Patent No.: US 8,713,095 B2
(45) Date of Patent: Apr. 29, 2014

(54) METHODS CIRCUITS APPARATUSES AND SYSTEMS FOR FACILITATING ACCESS TO ONLINE CONTENT

(76) Inventors: Nir Ashkenazy, Caesarea (IL); Moshe Shomer, Herzeliya (IL)

(*) Notice: Subject to any disclaimer, the term of this patent is extended or adjusted under 35 U.S.C. 154(b) by 546 days.

(21) Appl. No.: 13/046,749

(22) Filed: Mar. 13, 2011

(65) Prior Publication Data

US 2012/0233243 A1 Sep. 13, 2012

(51) Int. Cl.
*G06F 15/16* (2006.01)

(52) U.S. Cl.
USPC .......................................................... 709/203

(58) Field of Classification Search
CPC ..... G06Q 20/10; G06Q 20/105; G06Q 20/20; G06Q 20/34; G06Q 20/341; G06Q 20/354; G06F 21/34; G06F 19/322
USPC .......................................... 709/203; 713/182
See application file for complete search history.

(56) References Cited

U.S. PATENT DOCUMENTS

| 7,302,703 | B2 * | 11/2007 | Burns .............................. 726/20 |
| 7,873,994 | B1 * | 1/2011 | Wu .................................. 726/14 |
| 8,024,790 | B2 * | 9/2011 | Zhao et al. ....................... 726/17 |
| 2002/0010617 | A1 * | 1/2002 | Hamaguchi et al. ............. 705/10 |
| 2006/0231611 | A1 * | 10/2006 | Chakiris et al. ................ 235/380 |
| 2008/0114696 | A1 * | 5/2008 | Singh et al. ...................... 705/66 |
| 2011/0010470 | A1 * | 1/2011 | Hulbert et al. .................. 710/13 |

* cited by examiner

*Primary Examiner* — John MacIlwinen
(74) *Attorney, Agent, or Firm* — Vladimir Sherman; Professional Patent Solutions

(57) ABSTRACT

Disclosed are methods, circuits, apparatuses and systems for facilitating access to online content, including personalized content. A content access peripheral (CAP) may be provided, such that the CAP may be operated in conjunction with a host computing platform (e.g. host device) in order to facilitate and/or expedite access to online content residing/stored on a computer server connected to the Internet or to another distributed data network. The CAP may initially be associated with specific content(s) residing/stored on the computer server connected to the Internet or to another distributed data network by a CAP to content correlator.

26 Claims, 19 Drawing Sheets

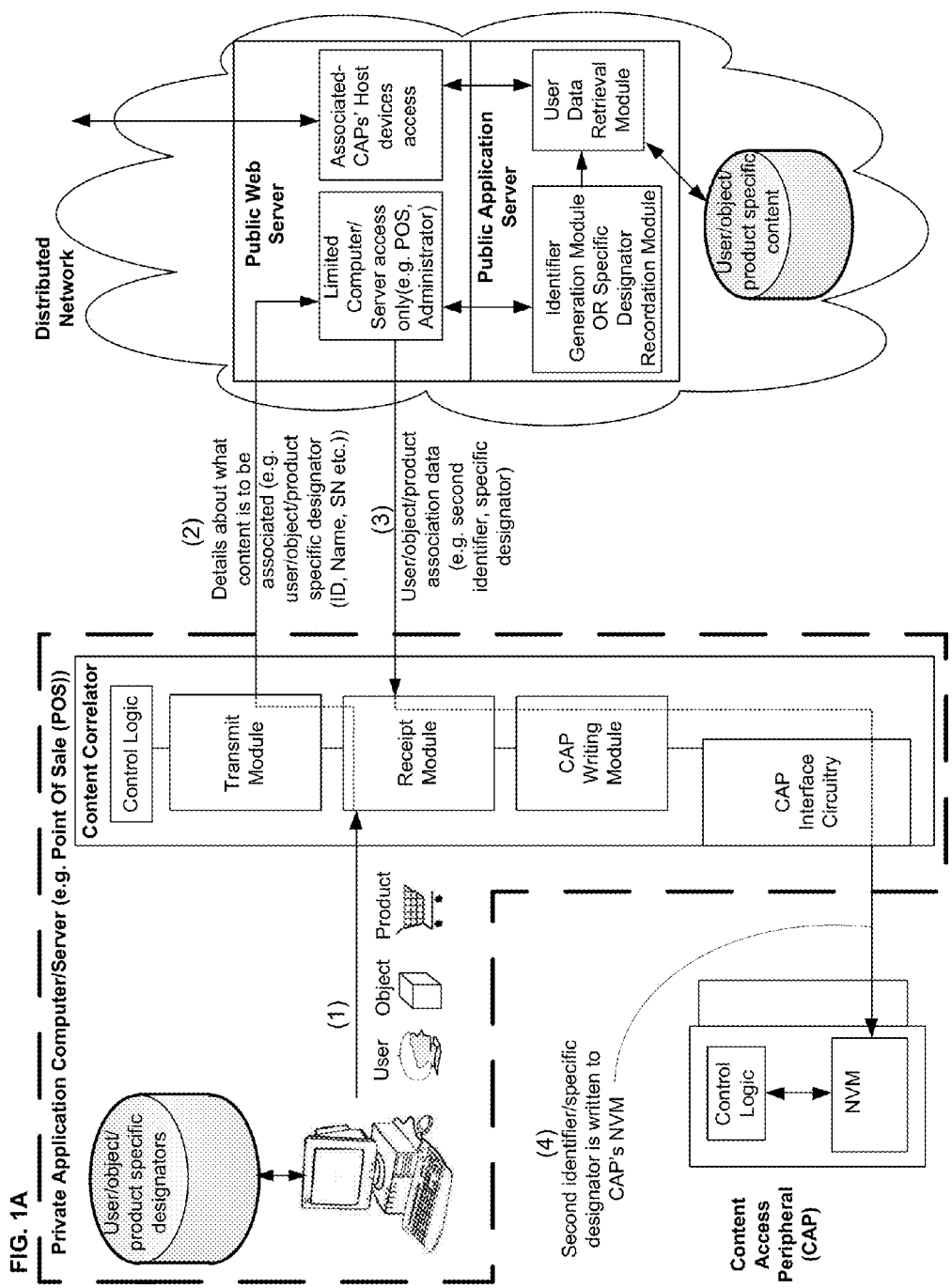

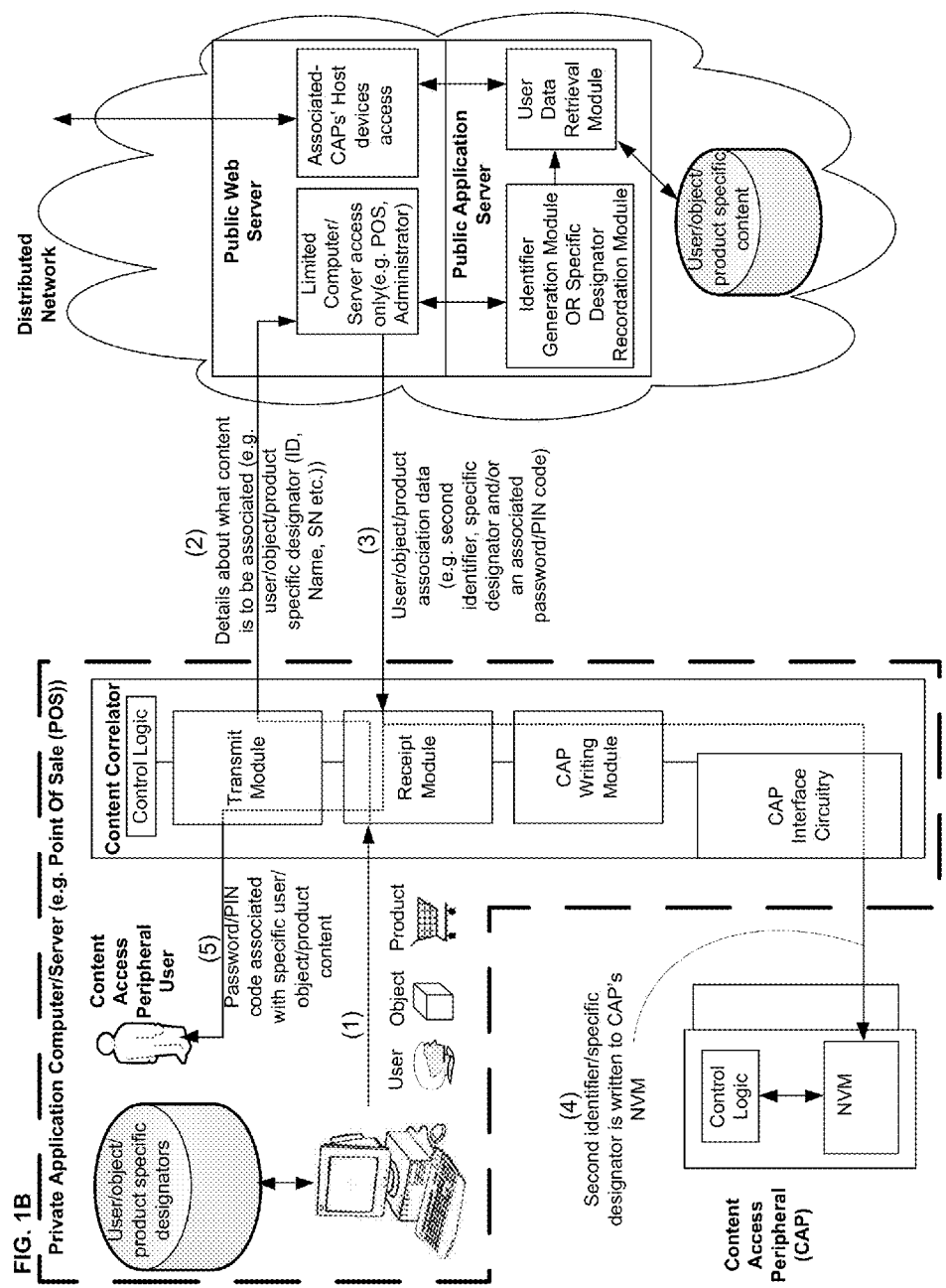

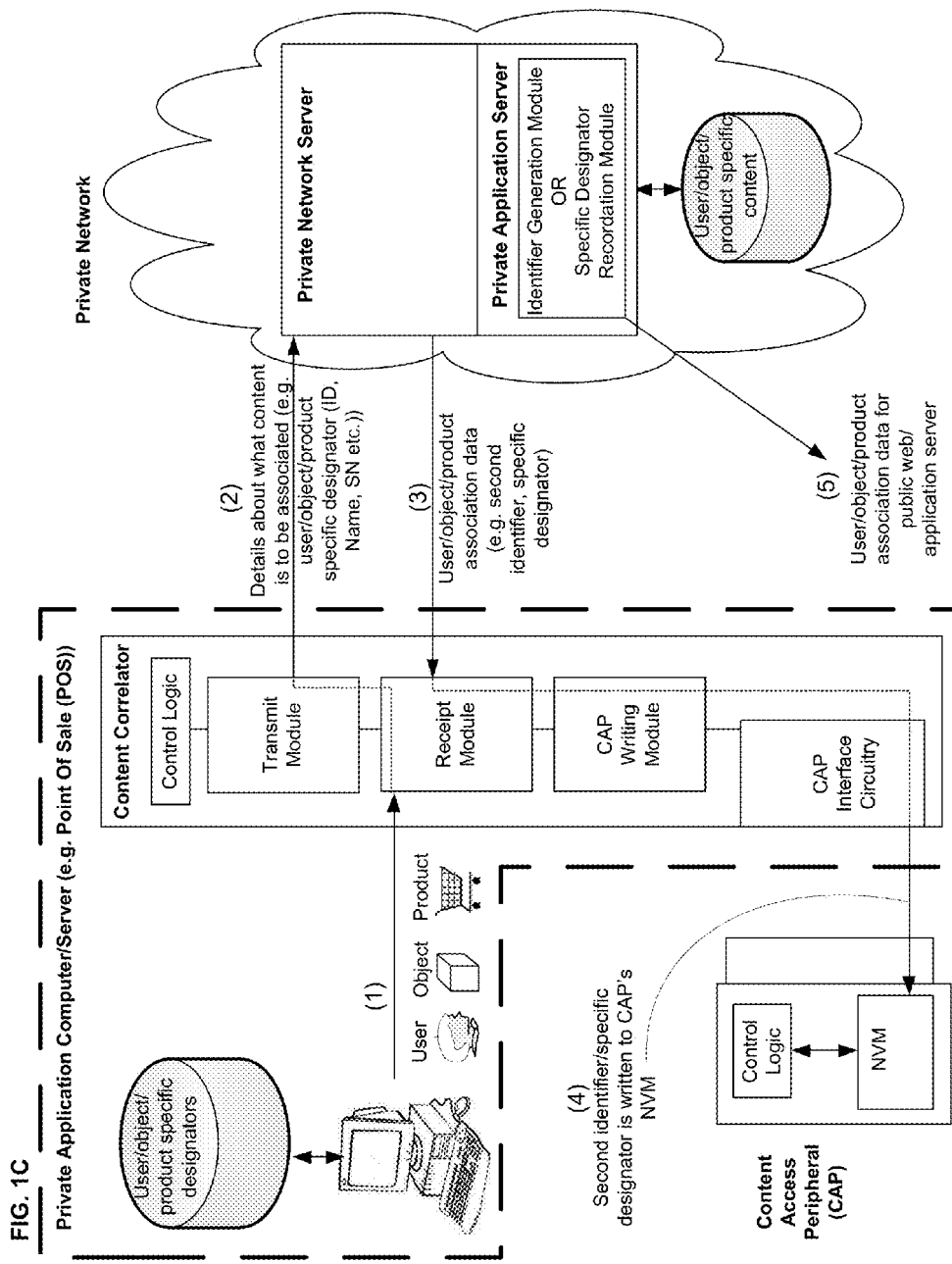

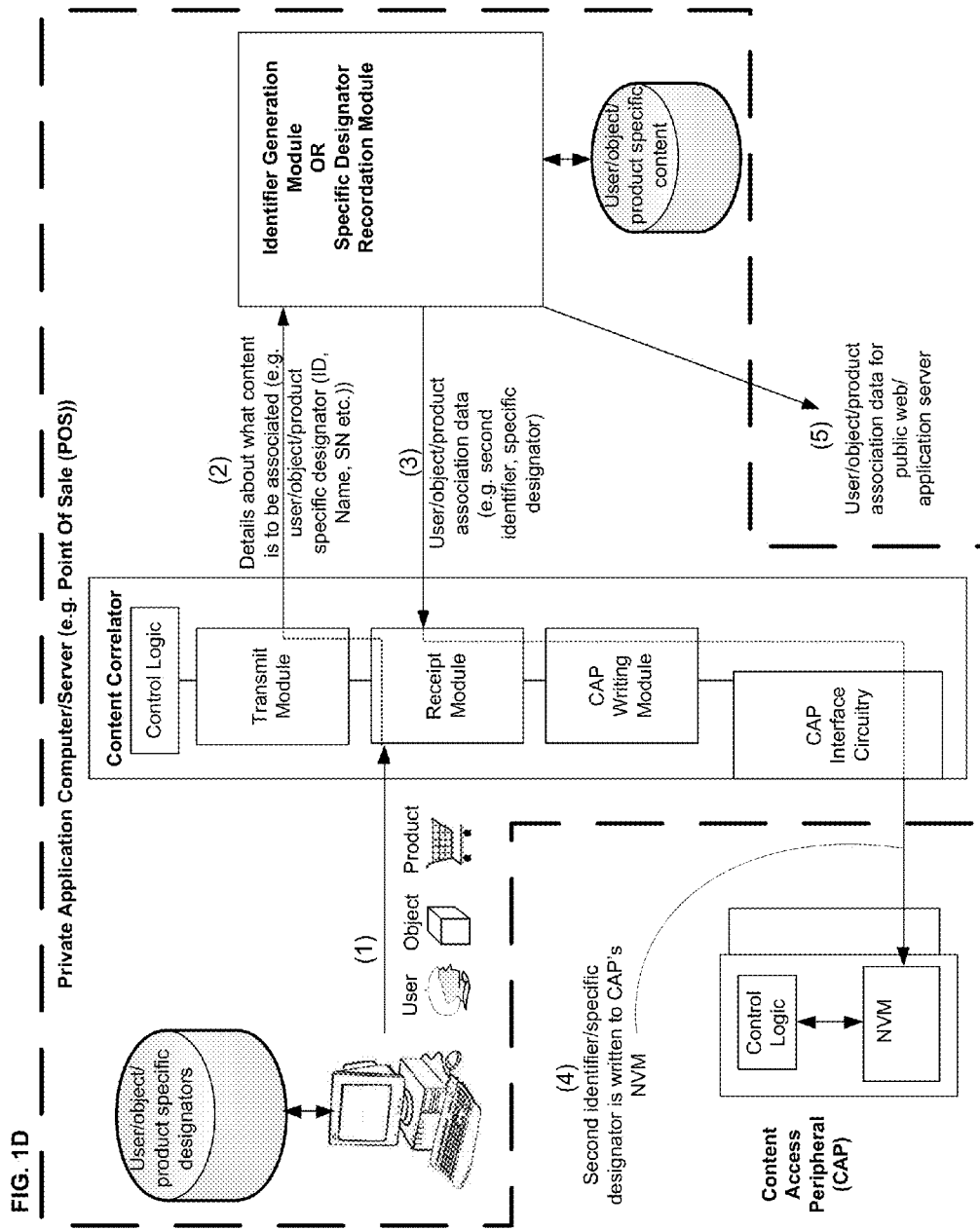

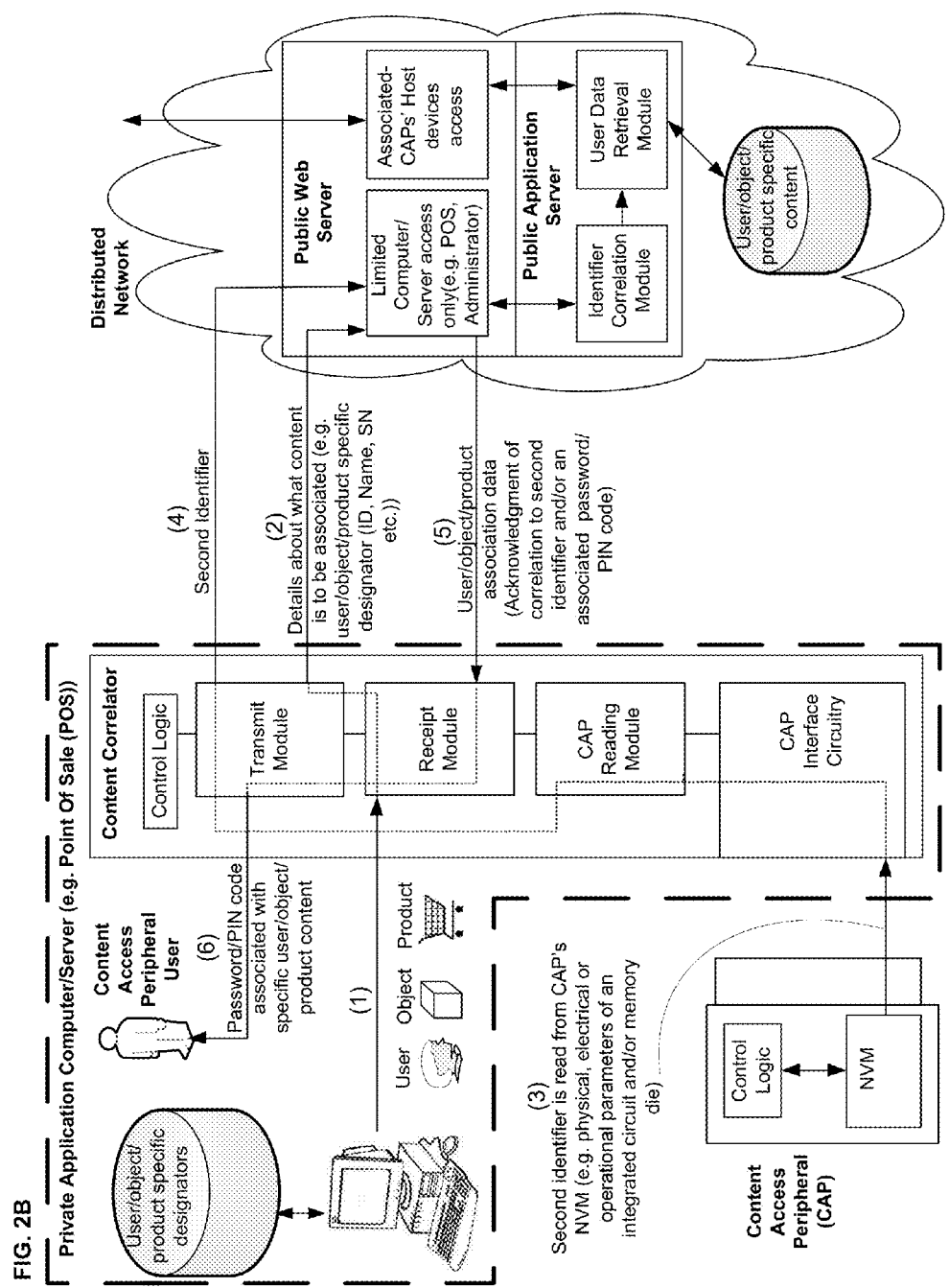

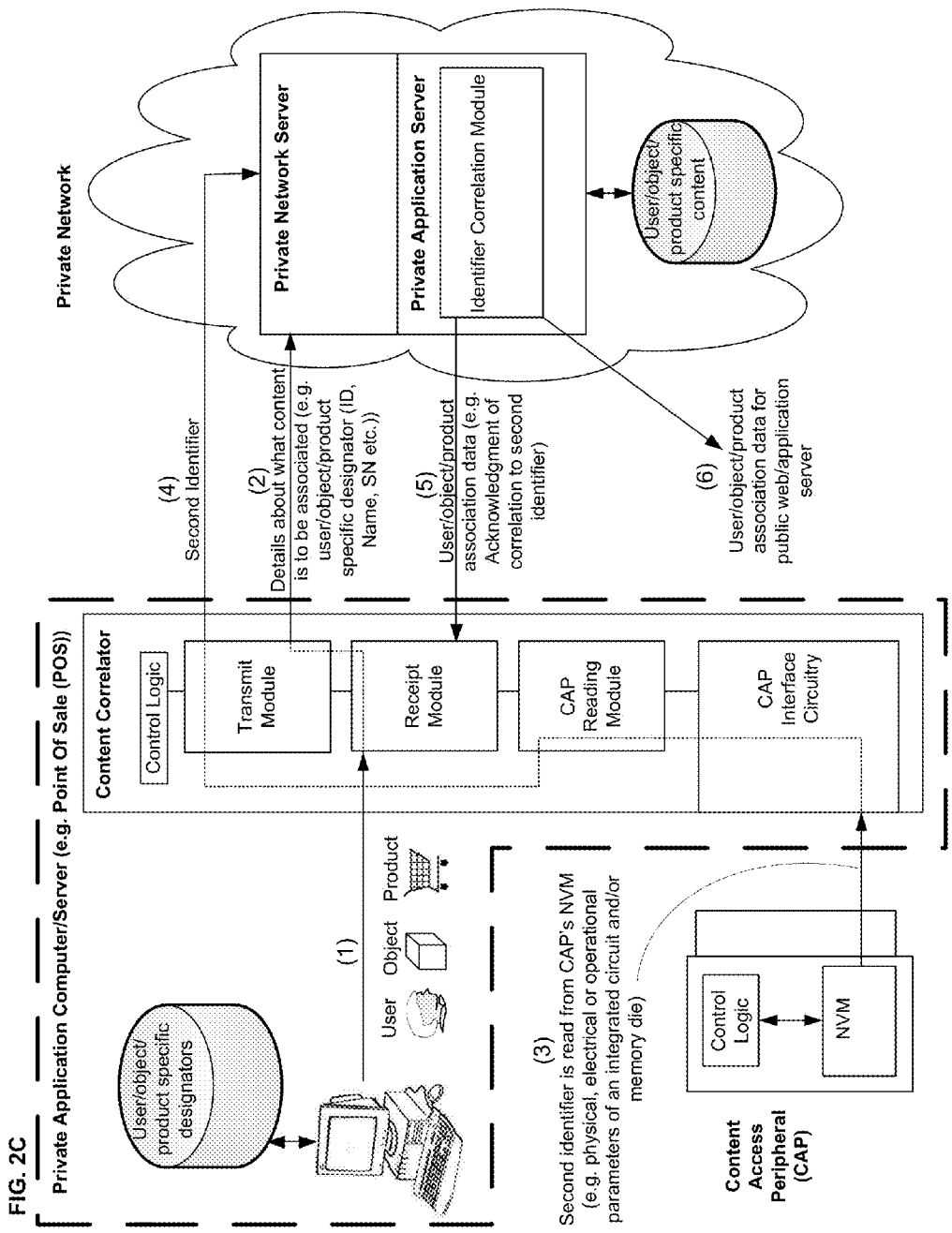

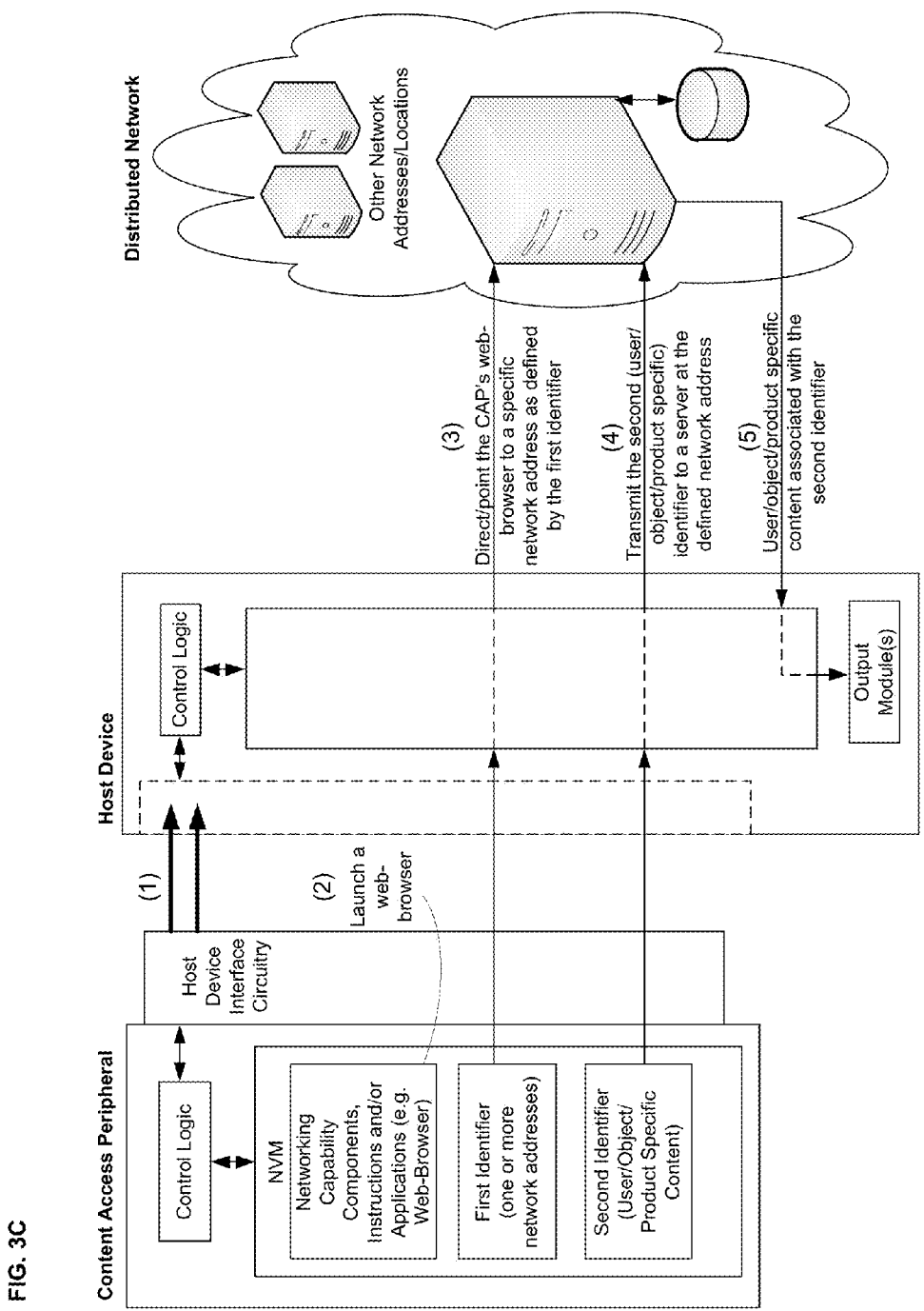

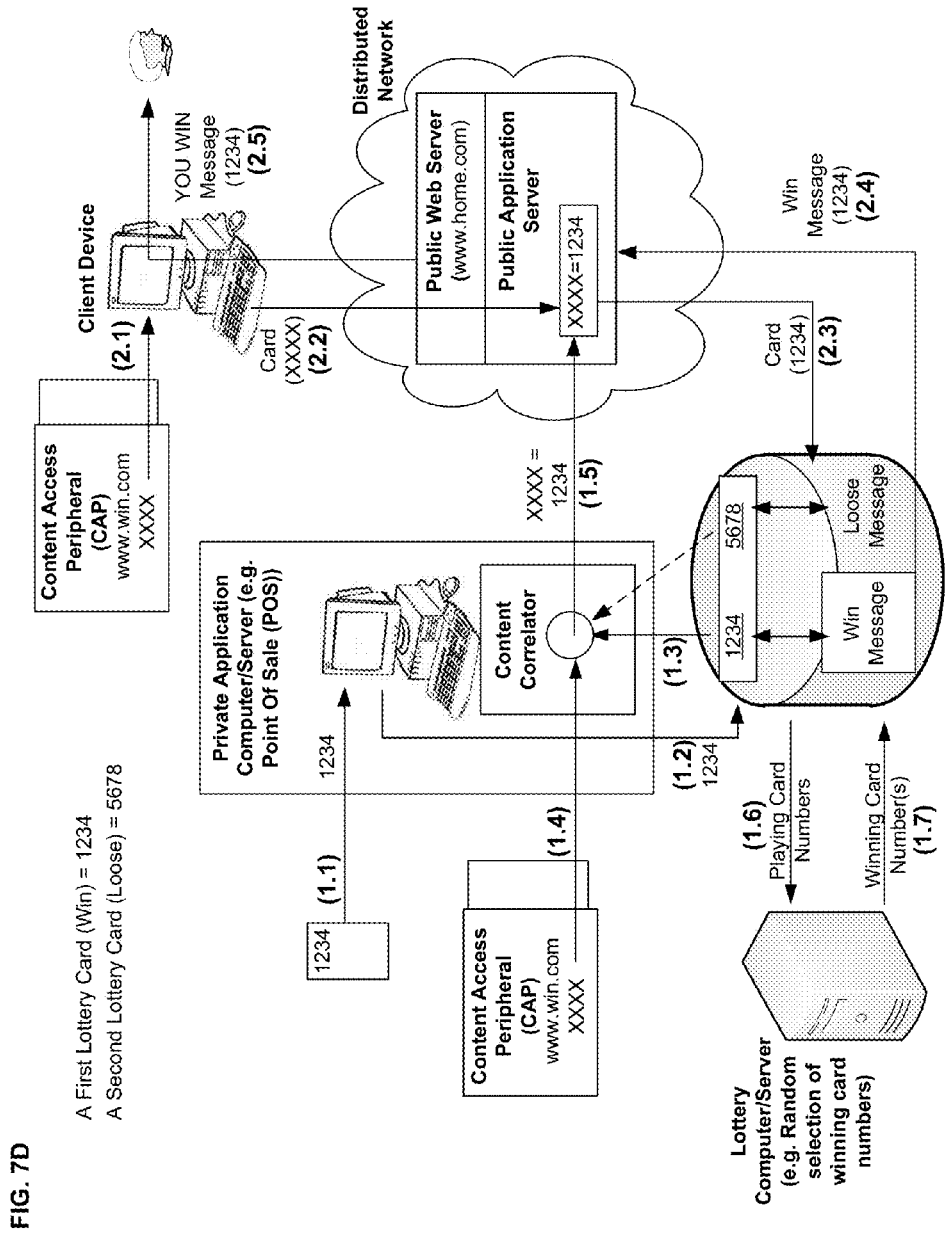

METHODS CIRCUITS APPARATUSES AND SYSTEMS FOR FACILITATING ACCESS TO ONLINE CONTENT

FIELD OF THE INVENTION

The present invention generally relates to methods, circuits, apparatuses and systems for facilitating access to online content, including personalized content. More specifically, the present invention relates to methods, circuits, apparatus and systems that allow for a peripheral device to be associated with specific content residing/stored on a computer server connected to the Internet or to another distributed data network, and for the peripheral device to be later used for facilitating access to the associated content.

BACKGROUND

Web key USB Website Launchers have been increasing in popularity in recent years. Pre-programmed with a website URL and adapted to cause their hosting device to interpret their signals as coming from a keyboard, the ability to plug a web key into a USB port and have a website, or webpage, launch automatically appealed to many.

Web keys have shown to be an effective way of promoting companies and new product launches, distributing of training material, reward pages and special offers, and an effective way of getting clients to remember a company without remembering a lengthy URL, while showing a higher website visit rates than those achieved through many common website promotion methods.

Taking the above into account, there clearly remains a need for better and more efficient web keys that may be used for accessing not only a particular web destination, but also specific content, including personal and/or personalized content, relating to the web key user, a certain product or service or any other object or item; based on an association of a given web key to that specific content.

SUMMARY OF THE INVENTION

Below are described a number of novel, innovative features of methods, circuits, apparatuses and systems for facilitating access to online content, including personalized content.

The present invention includes methods, circuits, apparatus and systems for facilitating access to online content, including personalized content. According to some embodiments, a content access peripheral (CAP) may be provided, such that the CAP may be operated in conjunction with a host computing platform (e.g. host device) in order to facilitate and/or expedite access to online content residing/stored on a computer server connected to the Internet or to another distributed data network. According to some embodiments, the CAP may initially be associated with specific content residing/stored on the computer server connected to the Internet or to another distributed data network by a CAP to content correlator.

According to some embodiments of the present invention, the CAP may include: (1) non-volatile memory (NVM), (2) host device interface circuitry, and (3) control logic adapted to initiate signaling to a connected host device, through the interface circuitry, and based on the data stored on the non-volatile memory. According to some embodiments, data stored on the NVM may include: (1) a first identifier associated with one or more network addresses, and (2) a second identifier associated with specific content, wherein the specific content may be either user specific and/or object/product specific (e.g. user identification number, product/service serial number, object designator and/or any combination(s) of such).

According to some embodiments, the CAP to content correlator may be adapted to associate the second identifier of a CAP with user/object/product specific content on a server accessed at the network address associated with the first identifier. According to some embodiments, the CAP to content correlator may associate the second identifier of a CAP by (1) reading a prewritten second identifier from the CAP NVM and transmitting it, along with information about the specific data to be associated, to the server at the network address associated with the first identifier for association, or (2) transmitting information about the specific data to be associated to the server at the network address associated with the first identifier, receiving from the server one or more association data parameters and writing them to the CAP NVM as the CAP's second identifier.

According to some embodiments of the present invention, the CAP to content correlator may include: (1) a control logic, (2) a CAP interface circuitry, (3) a receipt module adapted to input one or more, typed, scanned, recorded, read or else wise obtained user/object/product specific designator(s), (4) a transmit module adapted to transmit the specific designator(s) to an identifier generation module at the network address associated with the first identifier, wherein the receipt module may be further adapted to input the specific content association data generated by the identifier generation module (e.g. a user/object/product designator(s) corresponding identifier), and (5) a CAP writing module adapted to write the generated identifier to the CAP's NVM portion as its second identifier.

According to further embodiments of the present invention, the CAP to content correlator may include: (1) a control logic, (2) a CAP interface circuitry, (3) a CAP reading module adapted to read the second identifier from the CAP NVM, (4) a receipt module adapted to input one or more, typed, scanned, recorded, read or else wise obtained user/object/product specific designator(s), and (5) a transmit module adapted to transmit the specific designator(s) and the read second identifier to an identifier generation module at the network address associated with the first identifier, and wherein the receipt module may be further adapted to input the specific content association data generated by the identifier generation module (e.g. an association acknowledgment).

According to some embodiments of the present invention, the CAP to content correlator may be implemented on a dedicated computer/server, as one or more sub-parts of a computer/server (e.g. as part of a Point Of Sale (POS) computer), on a privately networked computer/server, on a publicly networked computer/server comprising a limited access functionality capability and/or on any combination of such. Furthermore, information about the specific data to be associated (e.g. user/object/product designator(s)) may be typed (e.g. by keyboard), scanned (e.g. by bar-code or other code scanner), recorded (e.g. by voice recognition), read (e.g. from a local or networked database) or else wise obtained by the CAP to content correlator.

According to some embodiments of the present invention, the control logic, of a specific-content associated CAP, working in concert with the CAP interface circuitry may be adapted to emulate an input device (e.g. keyboard) of a host device to which the CAP is connected. The CAP NVM may further include instructions and/or drivers for the host device which, when loaded on the host device, cause the host device to interpret signaling from the CAP as signaling from an input device such as a keyboard (for example as taught in U.S. Pat.

No. 7,865,640 'USB WEB LAUNCHER USING KEYBOARD SCAN CODES' which is herby incorporated in its entirety). The CAP, when connected with a host device, may cause the host device to: (1) launch a web-browser, (2) direct/point the web-browser to a specific network address as defined by the first identifier, and (3) to cause the web-browser to transmit the second (user/object/product specific) identifier to a server at the defined network address.

According to further embodiments of the present invention, a web server and/or an application-server and/or a database-server at the defined network address may present to the browser user/object/product specific content associated with the second identifier, wherein the specific content may be (1) Personal user content such as, but not limited to, medical records, financial records, educational records, legal records; (2) Content related to a product or a service such as, but not limited to, product operation manuals, product assembly instructions, terms and conditions of a service, product technical specifications, fees/costs for a group of offered services and/or products; and/or (3) Content related to an object which is not a commercial good or service such as, but not limited to, content related to a certain tourist attraction, content related to a location of a certain destination, content related to a certain set of rules/regulations/recommendations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying figures:

In FIGS. 1A-1D there are shown, in accordance with some embodiments of the present invention, exemplary configurations of Content Access Peripheral (CAP) to specific content association, wherein a second identifier is written onto the CAP as part of the association process;

In FIGS. 2A-2D there are shown, in accordance with some embodiments of the present invention, exemplary configurations of Content Access Peripheral (CAP) to specific content association, wherein a second identifier is read from the CAP as part of the association process;

In FIGS. 3A-3D there are shown, in accordance with some embodiments of the present invention, exemplary configurations of a content-associated Content Access Peripheral (CAP) to Host Device connection, wherein the CAP utilizes the host device for accessing the specific content;

DETAILED DESCRIPTION

Figure 2A:
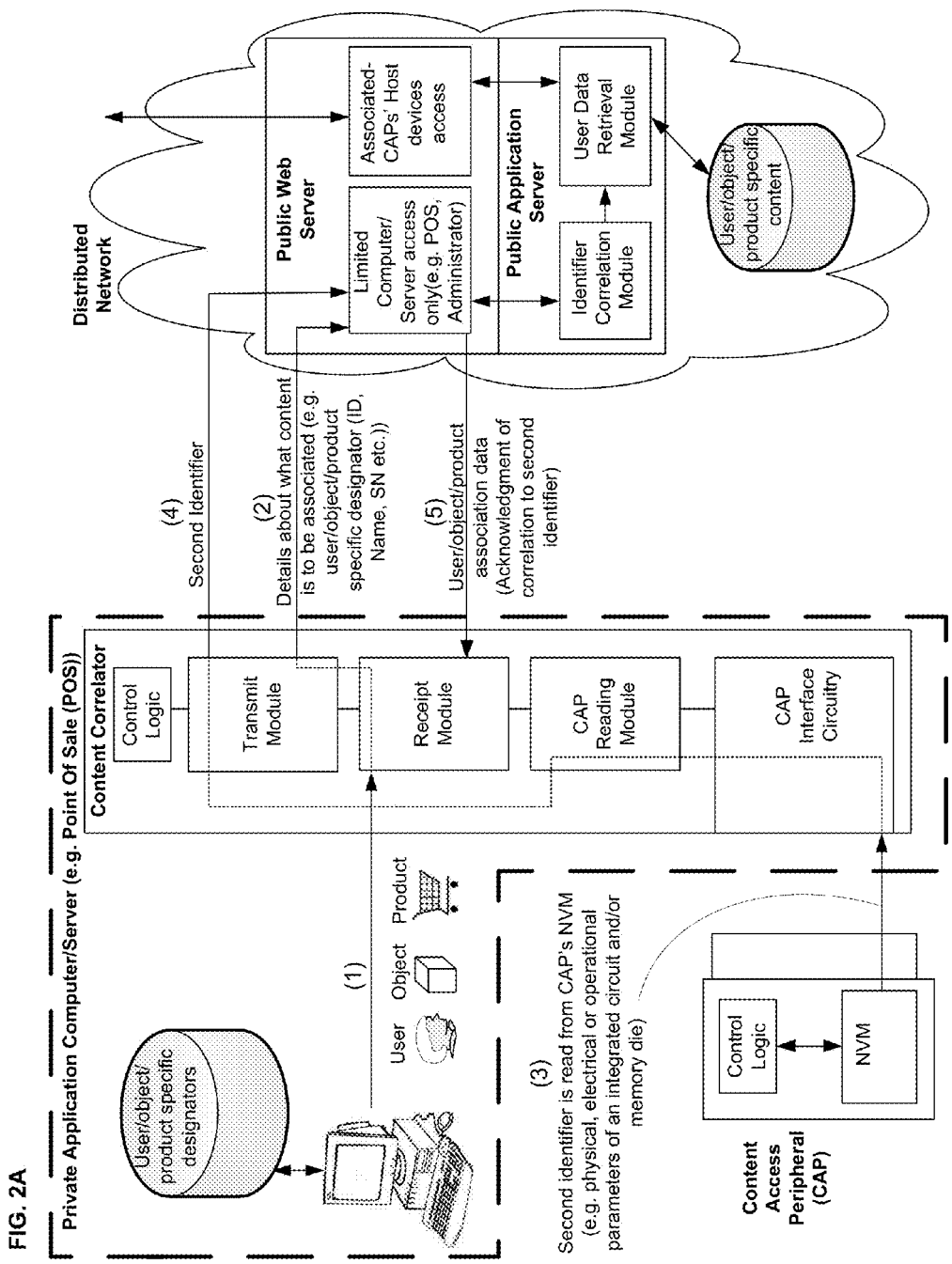

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes methods, circuits, apparatus and systems for facilitating access to online content, including personalized content. According to some embodiments, a content access peripheral (CAP) may be provided, such that the CAP may be operated in conjunction with a host computing platform (e.g. host device) in order to facilitate and/or expedite access to online content residing/stored on a computer server connected to the Internet or to another distributed data network. According to some embodiments, the CAP may initially be associated with specific content residing/stored on the computer server connected to the Internet or to another distributed data network by a CAP to content correlator.

According to some embodiments of the present invention, the CAP may include: (1) non-volatile memory (NVM), (2) host device interface circuitry, and (3) control logic adapted to initiate signaling to a connected host device, through the interface circuitry, and based on the data stored on the non-volatile memory. According to some embodiments, data stored on the NVM may include: (1) a first identifier associated with one or more network addresses, and (2) a second identifier associated with specific content, wherein the specific content may be either user specific and/or object/product specific (e.g. user identification number, product/service serial number, object designator and/or any combination(s) of such).

According to some embodiments, the CAP to content correlator may be adapted to associate the second identifier of a CAP with user/object/product specific content on a server accessed at the network address associated with the first identifier. According to some embodiments, the CAP to content correlator may associate the second identifier of a CAP by (1) reading a prewritten second identifier from the CAP NVM and transmitting it, along with information about the specific data to be associated, to the server at the network address associated with the first identifier for association, or (2) transmitting information about the specific data to be associated to the server at the network address associated with the first identifier, receiving from the server one or more association data parameters and writing them to the CAP NVM as the CAP's second identifier.

According to some embodiments of the present invention, the CAP to content correlator may include: (1) a control logic, (2) a CAP interface circuitry, (3) a receipt module adapted to input one or more, typed, scanned, recorded, read or else wise obtained user/object/product specific designator(s), (4) a transmit module adapted to transmit the specific designator(s) to an identifier generation module at the network address associated with the first identifier, wherein the receipt module may be further adapted to input the specific content association data generated by the identifier generation module (e.g. a user/object/product designator(s) corresponding identifier), and (5) a CAP writing module adapted to write the generated identifier to the CAP's NVM portion as its second identifier.

According to further embodiments of the present invention, the CAP to content correlator may include: (1) a control logic, (2) a CAP interface circuitry, (3) a CAP reading module adapted to read the second identifier from the CAP NVM, (4) a receipt module adapted to input one or more, typed, scanned, recorded, read or else wise obtained user/object/product specific designator(s), and (5) a transmit module adapted to transmit the specific designator(s) and the read second identifier to an identifier generation module at the network address associated with the first identifier, and wherein the receipt module may be further adapted to input the specific content association data generated by the identifier generation module (e.g. an association acknowledgment).

According to some embodiments of the present invention, the CAP to content correlator may be implemented on a dedicated computer/server, as one or more sub-parts of a computer/server (e.g. as part of a Point Of Sale (POS) computer), on a privately networked computer/server, on a publicly networked computer/server comprising a limited access functionality capability and/or on any combination of such. Furthermore, information about the specific data to be associated (e.g. user/object/product designator(s)) may be typed (e.g. by keyboard), scanned (e.g. by bar-code or other code scanner), recorded (e.g. by voice recognition), read (e.g. from a local or networked database) or else wise obtained by the CAP to content correlator.

According to some embodiments of the present invention, the control logic, of a specific-content associated CAP, working in concert with the CAP interface circuitry may be adapted to emulate an input device (e.g. keyboard) of a host device to which the CAP is connected. The CAP NVM may further include instructions and/or drivers for the host device which, when loaded on the host device, cause the host device to interpret signaling from the CAP as signaling from an input device such as a keyboard (for example as taught in U.S. Pat. No. 7,865,640 'USB WEB LAUNCHER USING KEYBOARD SCAN CODES' which is herby incorporated in its entirety). The CAP, when connected with a host device, may cause the host device to: (1) launch a web-browser, (2) direct/point the web-browser to a specific network address as defined by the first identifier, and (3) to cause the web-browser to transmit the second (user/object/product specific) identifier to a server at the defined network address.

According to further embodiments of the present invention, a web server and/or an application-server and/or a database-server at the defined network address may present to the browser user/object/product specific content associated with the second identifier, wherein the specific content may be (1) Personal user content such as, but not limited to, medical records, financial records, educational records, legal records; (2) Content related to a product or a service such as, but not limited to, product operation manuals, product assembly instructions, terms and conditions of a service, product technical specifications, fees/costs for a group of offered services and/or products; and/or (3) Content related to an object which is not a commercial good or service such as, but not limited to, content related to a certain tourist attraction, content related to a location of a certain destination, content related to a certain set of rules/regulations/recommendations.

According to some exemplary embodiments of the present invention, wherein the Correlator associates by writing the second identifier to the CAP when it is issued by and received from the server, the CAP initiation (i.e. association to specific content) may include some or all of the following steps:
    a. Point of sale/service computer sends request to server including the details about what content is to be associated.
    b. Server responds with second identifier.
    c. Point of sale/service writes received second identifier to CAP.
    d. Optionally: Server responds with pin.

According to some exemplary embodiments, in which the Correlator associates by writing the second identifier to the CAP when it is issued by and received from the server, a patient going through a medical test may receive a CAP (e.g. at the clinic service desk). Prior to its handoff to the patient, the CAP may initially contain a first identifier, for example, the web link to the clinic's website homepage. The correlator (e.g. a POS computer) may then be fed with the patient's ID number and the code of the specific medical test taken by the patient. The correlator may communicate the patient's ID number and the code of the medical test to the clinic's website internet server that may generate the second identifier, based on these parameters, in response. The second identifier may then be sent back to the correlator that may write it onto the CAP's NVM.

When connected to a host device, the CAP, now comprising the first and the second identifiers, may direct/point the host web-browser to the clinic's website homepage network address as defined by the first identifier. The CAP may then cause the host web-browser to transmit the second (patient and medical-test specific) identifier to the clinic's website server at the network address defined by the first identifier. The clinic's website server may use the second identifier to access its database (e.g. patient and med-test database), using it to retrieve and transmit to the web browser and thus to the patient, content which is specific to this particular patient and the medical test he went through (e.g. the results of the test).

According to some exemplary embodiments of the present invention, wherein the Correlator associates by sending to the server the second identifier which was already prewritten to the CAP, the CAP initiation (i.e. association to specific content) may include some or all of the following steps:
 a. Point of sale/service computer reads second identifier from CAP.
 b. POS sends second identifier and the details about what content is to be associated to server.
 c. Server responds with acknowledgment.
 d. Optionally: Server responds with pin.

According to some exemplary embodiments, in which the Correlator associates by sending to the server the second identifier which was already prewritten to the CAP, a patient going through a medical test may receive a CAP (e.g. at the clinic service desk). Prior to its handoff to the patient, the CAP may initially contain a first identifier, for example, the web link to the clinic's website homepage and a second identifier. The correlator (e.g. a POS computer) may be fed with the patient's ID number and the code of the specific medical test taken by the patient and send the second identifier and details about what content is to be associated to it (i.e. the patient's ID number and the code of the specific medical test) to the server. The server may acknowledge to the correlator the receipt and correlation of the second identifier to the specific delivered content.

When connected to a host device, the CAP may direct/point the host web-browser to the clinic's website homepage network address as defined by the first identifier. The CAP may then cause the host web-browser to transmit the second (patient and medical-test specific) identifier to the clinic's website server at the network address defined by the first identifier. The clinic's website server may use the second identifier to access its database (e.g. patient and med-test database), using it to retrieve and transmit to the web browser and thus to the patient, content which is specific to this particular patient and the medical test he went through (e.g. the results of the test).

In FIGS. 1A-1D there are shown, in accordance with some embodiments of the present invention, embodiments wherein a private application computer/server is adapted to host the Content Access Peripheral (CAP) and write the second identifier on to the CAP's NVM section, as part of a CAP initiation/pairing process.

In FIG. 1A there is shown, in accordance with some embodiments of the present invention, an exemplary system for facilitating access to online content wherein a content correlator of a private application computer/server is adapted to communicate one or more user/object/product specific designators (e.g. user ID, object name, product serial number (e.g. barcode)), read or received from a user/object/product or from a database containing data about users, objects and/or products (1), to a public web server on a distributed network (2). According to some embodiments, the public web server may comprise a limited access point/port/gate which may only allow for certain designated or registered computers/servers, such as, but in no way limited to, Point Of Sale (POS) computers, access to an identifier generation or specific designator recordation module of a public application server functionally associated with the public web server.

The identifier generation or specific designator recordation module may either record the specific user/object/product designator(s) or generate an identifier corresponding to specific content relating to the user/object/product based on their designator. The designator/identifier may then be transmitted back to the private application computer/server content correlator (3) and written to the CAP's NVM as its second identifier (4). The designator/identifier may also be transmitted to a user data retrieval module, of the public application server, that may be adapted to retrieve specific content for users of associated CAPs (CAPs onto which the second identifier has been previously written), which are connected to the public web server through a host device, based on a comparison/lookup of the second identifier read from the associated CAP to user/object/product designators/identifiers communicated to the user data retrieval module during their CAP initiation/pairing process.

In FIG. 1B there is shown, in accordance with some embodiments of the present invention, an exemplary system for facilitating access to online content, wherein the identifier generation or specific designator recordation module is further adapted to generate a PIN code or password and communicate it back to private application computer/server along with the second identifier. The communicated PIN code or password may be given to the CAP user (5) that may later need to submit it as part of securely accessing specific content also associated with the second identifier written to his CAP's NVM.

In FIG. 1C there is shown, in accordance with some embodiments of the present invention, an exemplary system for facilitating access to online content wherein a content correlator of a private application computer/server is adapted to communicate one or more user/object/product specific designators (e.g. user ID, object name, product serial number), read, received or else wise obtained from a user/object/product or from a database containing data about users, objects and/or products (1), to a private network server on a private network (2). According to some embodiments, the private network server may allow for certain privately networked computers/servers, such as, but in no way limited to, Point Of Sale (POS) computers, access to an identifier generation or specific designator recordation module of a private application server functionally associated with the private network server.

The identifier generation or specific designator recordation module may either record the specific user/object/product designator(s) or generate an identifier corresponding to specific content relating to the user/object/product based on their designator. The designator/identifier may then be transmitted back to the private application computer/server content correlator (3) and written to the CAP's NVM as its second identifier (4). The designator/identifier may also be transmitted to a public web/application server (5) that may be adapted to retrieve specific content for users of associated CAPs (CAPs onto which the second identifier has been previously written), which are connected to the public web/application server through a host device, based on a comparison/lookup of the second identifier read from the associated CAP to user/object/ product designators/identifiers communicated to the public web/application server during their respective CAP initiation/pairing process.

In FIG. 1D there is shown, in accordance with some embodiments of the present invention, an exemplary system for facilitating access to online content wherein a content correlator of a private application computer/server comprising an identifier generation or specific designator recordation module, is adapted to communicate one or more user/object/product specific designators (e.g. user ID, object name, product serial number), read or received from a user/object/product or from a database containing data about users, objects and/or products (1), to the identifier generation or specific designator recordation module (2).

The identifier generation or specific designator recordation module may either record the specific user/object/product designator(s) or generate an identifier corresponding to specific content relating to the user/object/product based on their designator. The designator/identifier may then be transmitted back to the private application computer/server content correlator (3) and written to the CAP's NVM as its second identifier (4). The designator/identifier may also be transmitted to a public web/application server (5) that may be adapted to retrieve specific content for users of associated CAPs (CAPs onto which the second identifier has been previously written), which are connected to the public web/application server through a host device, based on a comparison/lookup of the second identifier read from the associated CAP to user/object/product designators/identifiers communicated to the public web/application server during their respective CAP initiation/pairing process.

In FIGS. 2A-2D there are shown, in accordance with some embodiments of the present invention, embodiments wherein a private application computer/server is adapted to host the Content Access Peripheral (CAP) and read the second identifier from the CAP's NVM section, as part of a CAP initiation/pairing process.

In FIG. 2A there is shown, in accordance with some embodiments of the present invention, an exemplary system for facilitating access to online content wherein a content correlator of a private application computer/server is adapted to communicate one or more user/object/product specific designators (e.g. user ID, object name, product serial number), read or received from a user/object/product or from a database containing data about users, objects and/or products (1), to a public web server on a distributed network (2). The content correlator may be further adapted to read (3) and communicate (4) to a public web server a second identifier previously written to the CAP's NVM or a second identifier which is at least partially based on physical, electrical or operational parameters of an integrated circuit and/or a memory die of the CAP. According to some embodiments, the public web server may comprise a limited access point/port/gate which may only allow for certain designated or registered computers/servers, such as, but in no way limited to, Point Of Sale (POS) computers, access to an identifier correlation module of a public application server functionally associated with the public web server.

The identifier correlation module may correlate the communicated second identifier to specific content relating to the user/object/product based on their designator. An acknowledgment of correlation to the second identifier may then be transmitted back to the private application computer/server content correlator (5). The second identifier may be transmitted to a user data retrieval module, of the public application server, that may be adapted to retrieve specific content for users of associated CAPs (CAPs which second identifier has been previously correlated), which are connected to the public web server through a host device, based on a comparison/lookup of the second identifier read from the associated CAP to user/object/product designators/identifiers communicated to the user data retrieval module during their CAP initiation/pairing process.

In FIG. 2B there is shown, in accordance with some embodiments of the present invention, an exemplary system for facilitating access to online content, wherein the identifier correlation module is further adapted to generate a PIN code or password and communicate it back to private application computer/server along with the acknowledgment of correlation. The communicated PIN code or password may be given to the CAP user (6) that may later need to submit it as part of securely accessing specific content also associated with the second identifier written to his CAP's NVM.

In FIG. 2C there is shown, in accordance with some embodiments of the present invention, an exemplary system for facilitating access to online content wherein a content correlator of a private application computer/server is adapted to communicate one or more user/object/product specific designators (e.g. user ID, object name, product serial number), read, received or else wise obtained from a user/object/product or from a database containing data about users, objects and/or products (1), to a private network server on a private network (2).

The content correlator may be further adapted to read (3) and communicate (4) to a public web server a second identifier previously written to the CAP's NVM or a second identifier which is at least partially based on physical, electrical or operational parameters of an integrated circuit and/or a memory die of the CAP. According to some embodiments, the private network server may allow for certain privately networked computers/servers, such as, but in no way limited to, Point Of Sale (POS) computers, access to an identifier correlation module, of a private application server functionally associated with the private network server.

The identifier correlation module may correlate the communicated second identifier to specific content relating to the user/object/product based on their designator. An acknowledgment of correlation to the second identifier may then be transmitted back to the private application computer/server content correlator (5).

The correlation acknowledgment and/or association data may also be transmitted to a public web/application server (6) that may be adapted to retrieve specific content for users of associated CAPs (CAPs which second identifier has been previously correlated), which are connected to the public web/application server through a host device, based on a comparison/lookup of the second identifier read from the associated CAP to user/object/product designators/identifiers communicated to the public web/application server during their respective CAP initiation/pairing process.

Figure 2D:
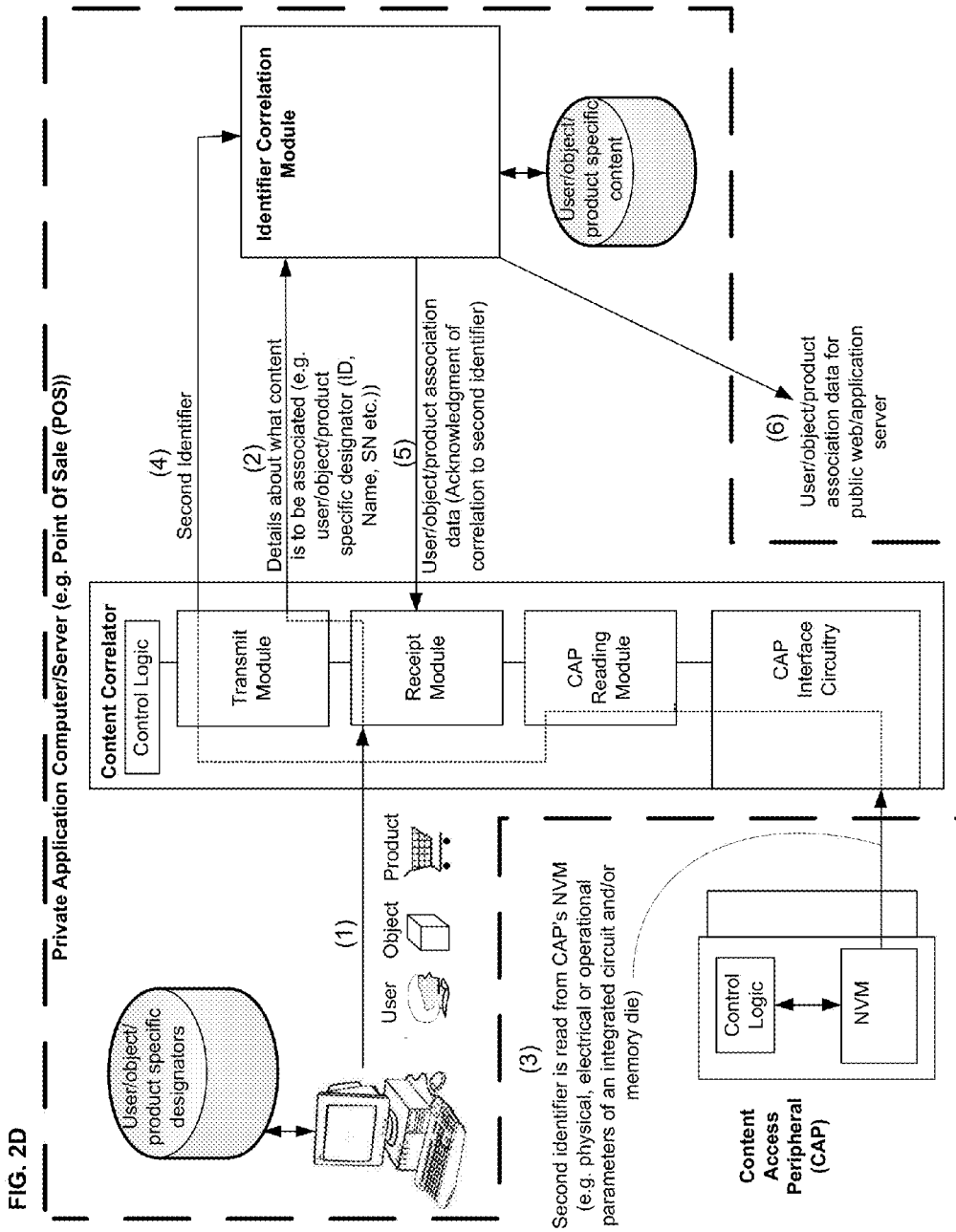

In FIG. 2D there is shown, in accordance with some embodiments of the present invention, an exemplary system for facilitating access to online content wherein a content correlator of a private application computer/server comprising an identifier correlation module, is adapted to communicate one or more user/object/product specific designators (e.g. user ID, object name, product serial number), read or received from a user/object/product or from a database containing data about users, objects and/or products (1), to the identifier correlation module (2).

The content correlator may be further adapted to read (3) and communicate (4) to the identifier correlation module a second identifier previously written to the CAP's NVM or a second identifier which is at least partially based on physical, electrical or operational parameters of an integrated circuit and/or a memory die of the CAP.

The identifier correlation module may correlate the communicated second identifier to specific content relating to the user/object/product based on their designator. An acknowledgment of correlation to the second identifier may then be transmitted back to the private application computer/server content correlator (5).

The correlation acknowledgment and/or association data may also be transmitted to a public web/application server (6) that may be adapted to retrieve specific content for users of associated CAPs (CAPs which second identifier has been previously correlated), which are connected to the public web/application server through a host device, based on a comparison/lookup of the second identifier read from the associated CAP to user/object/product designators/identifiers communicated to the public web/application server during their respective CAP initiation/pairing process.

In FIGS. 3A-3D there are shown, in accordance with some embodiments of the present invention, embodiments wherein a previously initiated/paired CAP is adapted to interface with a host device, direct its web-browser, or any other networking component or application, to a specific network address based on the CAP's first identifier and access content specific to the interfacing CAP based on its second identifier.

Figure 3A:
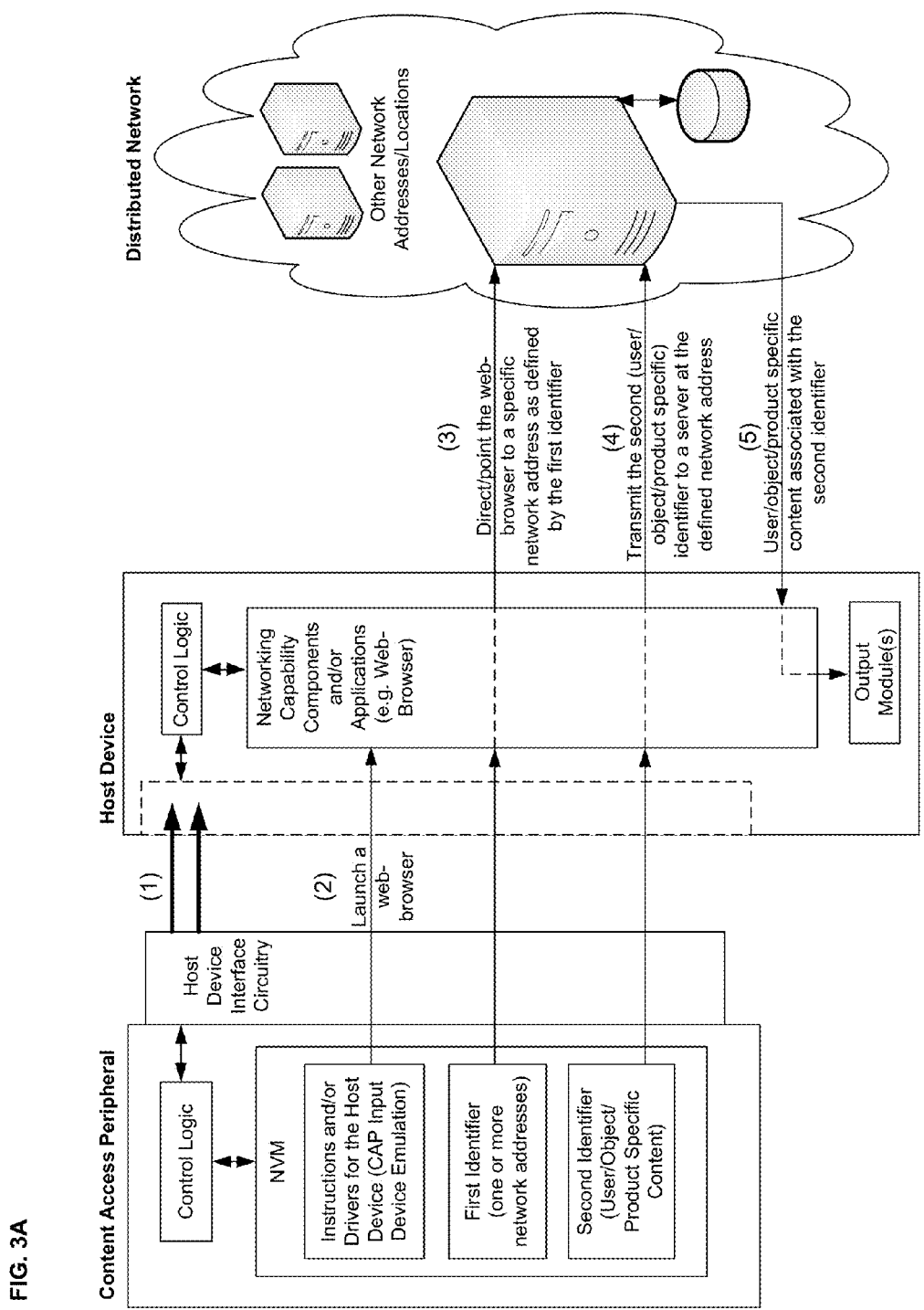

In FIG. 3A there is shown, in accordance with some embodiments of the present invention, an exemplary CAP comprising a host interface circuitry which is adapted to connect and interface with a host device (1). The CAP's control logic working in concert with the interface circuitry may be adapted to emulate an input device (e.g. keyboard) of the host device to which the CAP is connected. The CAP's NVM may also include instructions and/or drivers for the host device which, when loaded on the host device, cause the host device to interpret signaling from the CAP as signaling from an input device such as a keyboard.

The CAP, when connected with a host device, may cause the host device to: launch a web-browser (2), direct/point the host web-browser to a specific network address as defined by the first identifier (3) and to cause the web-browser to transmit the second (user/object/product specific) identifier to a server at the defined network address (4). In return a web-server and/or an application-server and/or a database-server, at the defined network address, may present to the browser user/object/product specific content associated with the second identifier (5).

Figure 3B:
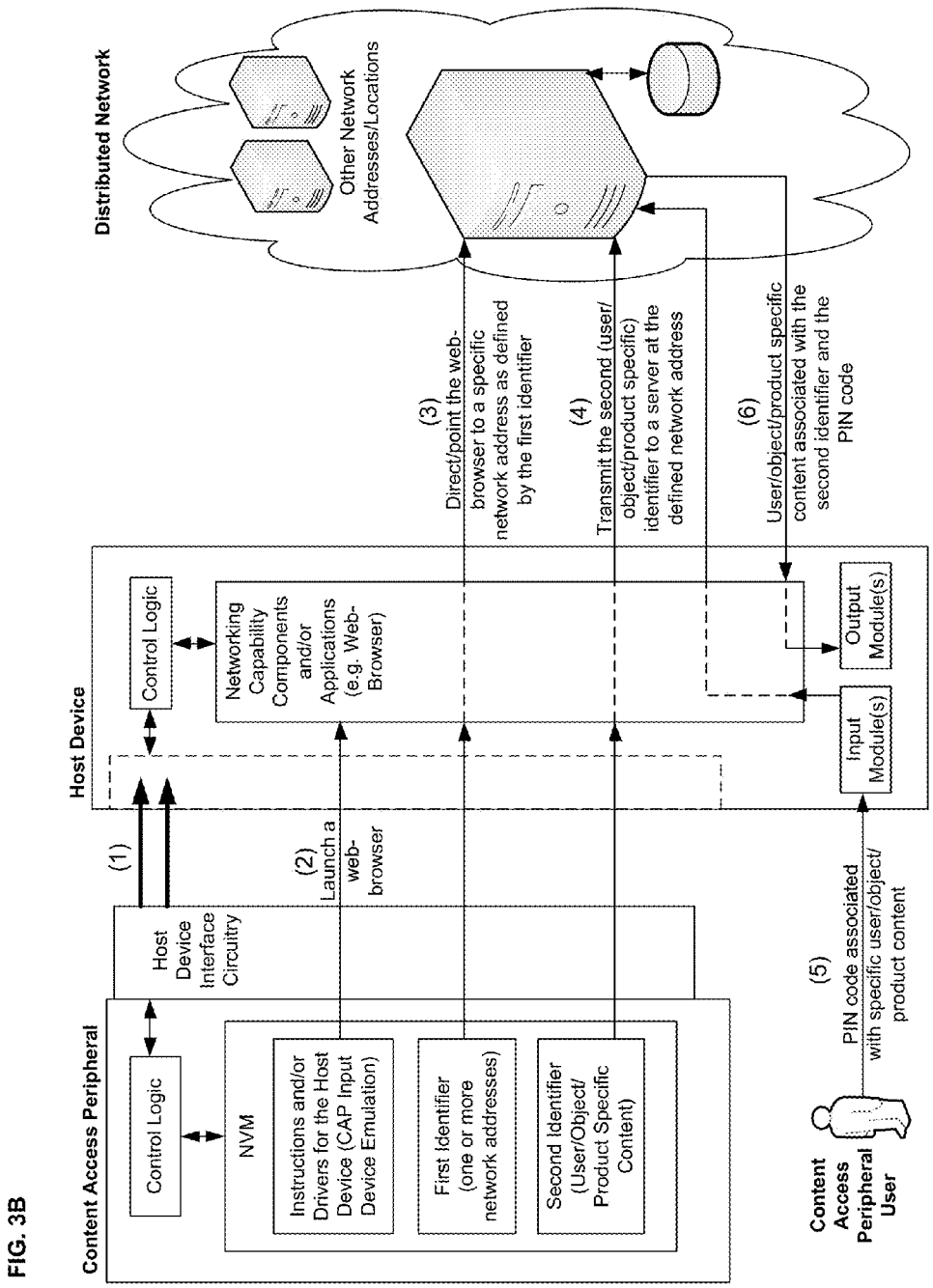

In FIG. 3B there is shown, in accordance with some embodiments of the present invention, an exemplary embodiment wherein prior to presenting to the browser user/object/product specific content associated with the second identifier (6) the CAP user is requested to submit a PIN code or password (generated as part of the CAP initiation/pairing process and given to the user thereafter) (5). The PIN/password may be associated with the specific content, also associated with the second identifier written to the respective CAP's NVM, and may be required, along with the second identifier, to allow access and presentation of the specific content.

In FIG. 3C there is shown, in accordance with some embodiments of the present invention, an exemplary embodiment wherein the CAP further comprises a web-browser, or any other networking component or application. The CAP control logic may be adapted to launch the CAP's web-browser (2) when the CAP is connected to a host device (1). The CAP, when connected with a host device, may further direct/point its web-browser to a specific network address as defined by the first identifier (3) and to cause its web-browser to transmit the second (user/object/product specific) identifier to a server at the defined network address (4). In return a web-server and/or an application-server and/or a database-server, at the defined network address, may present to the CAP's browser user/object/product specific content associated with the second identifier (5).

Figure 3D:
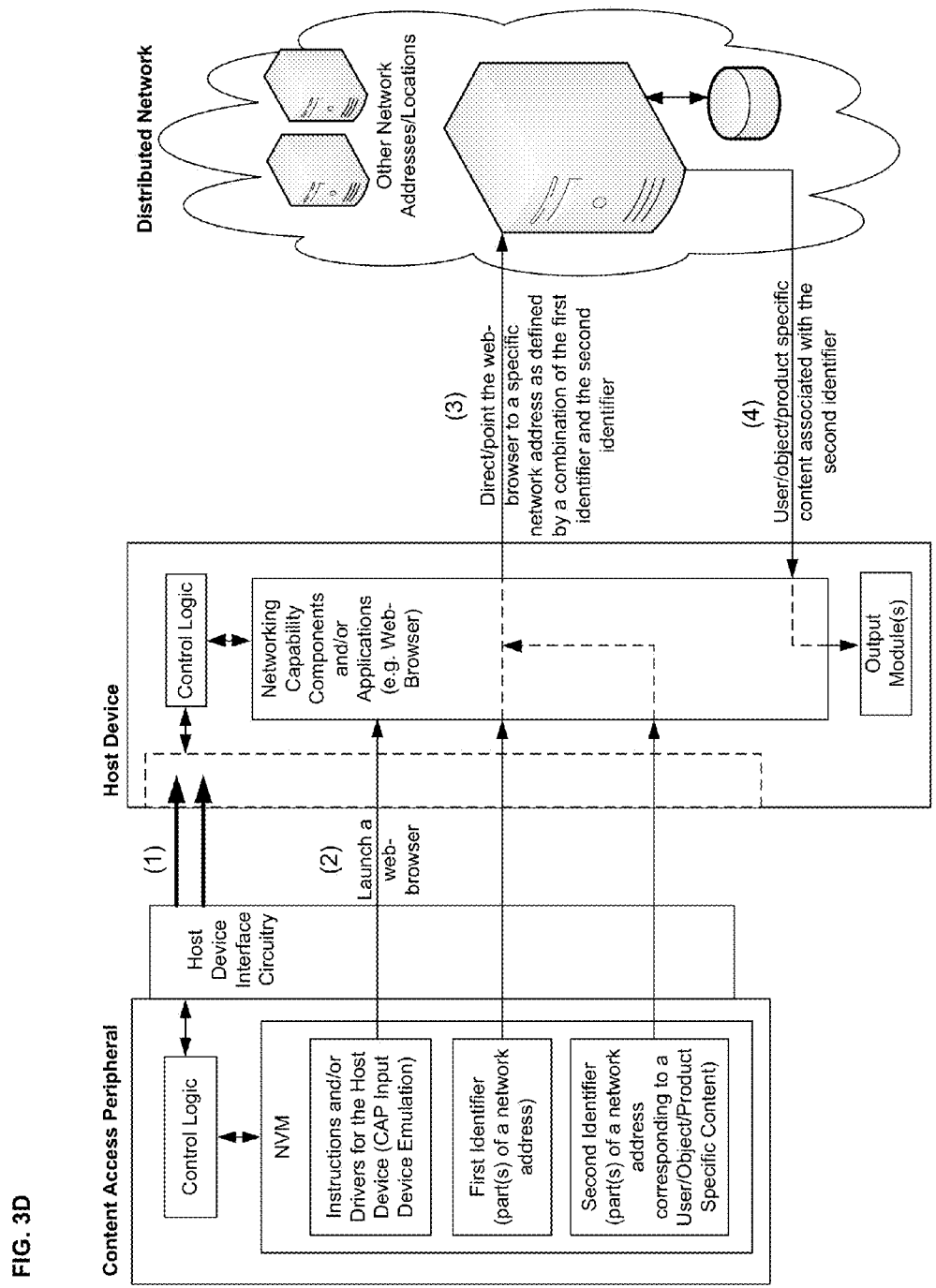

In FIG. 3D there is shown, in accordance with some embodiments of the present invention, an exemplary embodiment wherein the CAP's first identifier is a first part of a network address and the CAP's second identifier is a second part of that network address. A combination of the first and second parts of the network address may direct/point the browser (host's or CAP's) to a specific network address where the specific user/object/product content associated with the combination is found (3).

According to some embodiments, the first identifier may, for example, be the network address of a web-site's home page (e.g. a bank's home-page) and the second identifier may be the rest of the network address directing/pointing the browser from the home page to the CAP's specific content page (e.g. the CAP owner's bank account page). According to some embodiments, the first and/or second identifier may not be a valid network address whereas a certain combination of the first and second identifiers may yield a valid network address. According to some embodiments, any network address based on the first identifier, the second identifier or on a combination of both, may point/direct to a network address which is else wise substantially unreachable (e.g. page at network address is not linked to from other web pages and the network address string (e.g. URL) is substantially long and has no actual meaning).

Figure 4:
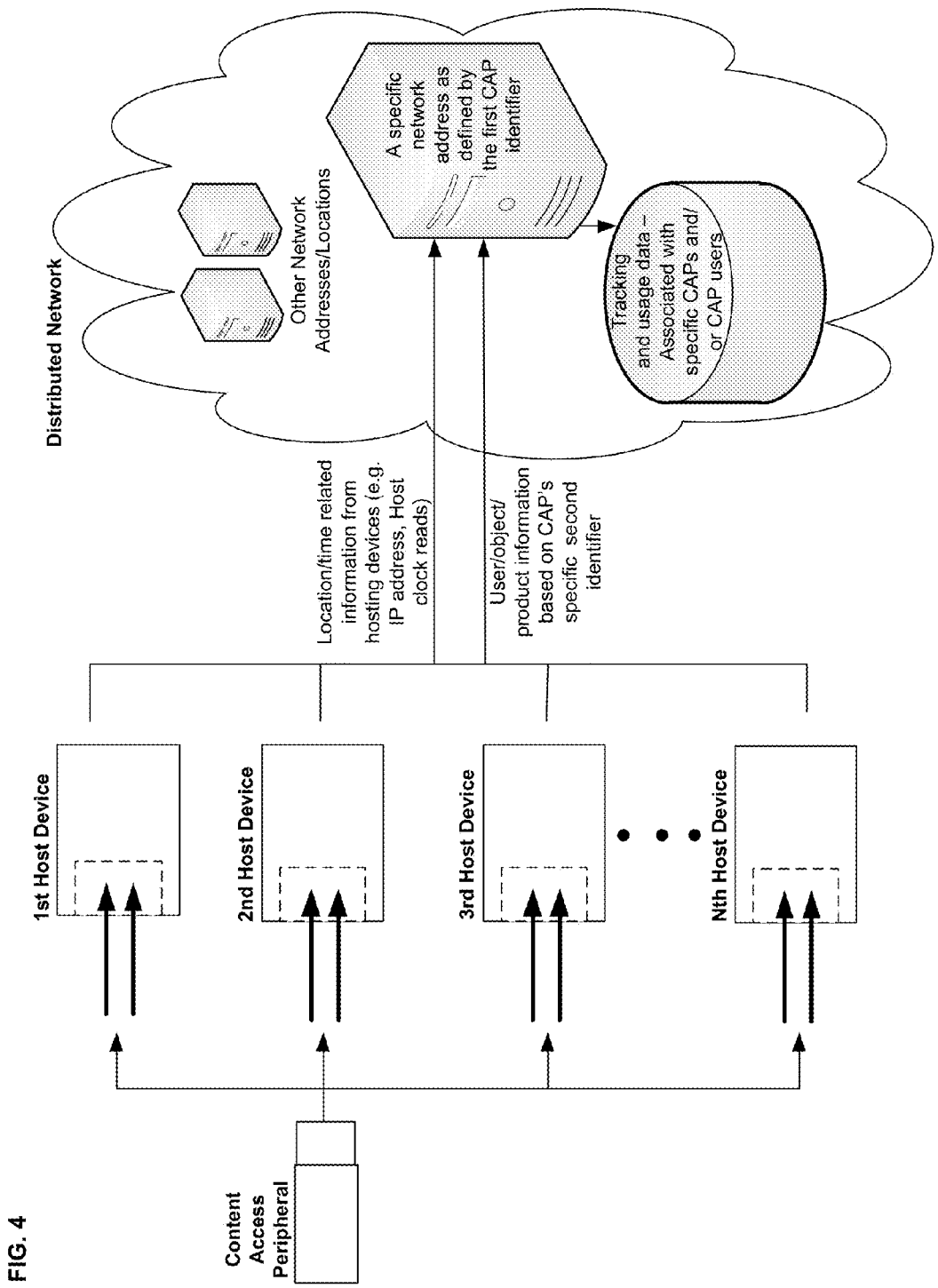
In FIG. 4 there is shown, in accordance with some embodiments of the present invention, an exemplary configuration of tracking a content-associated Content Access Peripheral (CAP) to Host Device connections, wherein the CAP provides information related to the content accessed and the host device provides information related to the time when and location from which the specific content was accessed.
Figure 5A:
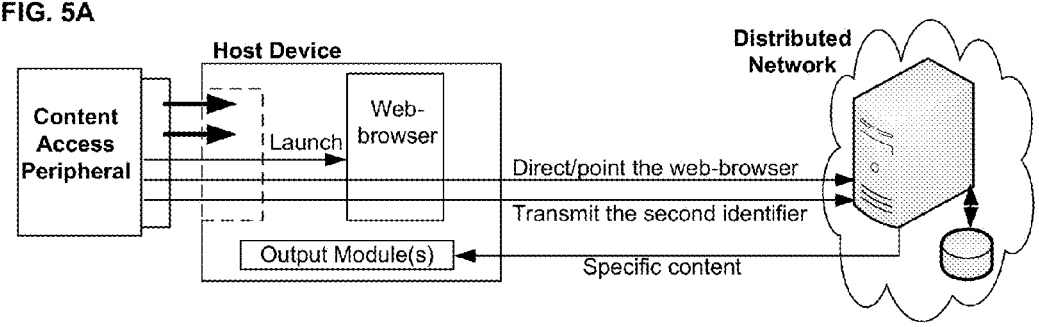
In FIGS. 5A-5D there are shown, in accordance with some embodiments of the present invention, exemplary stages of a content-associated Content Access Peripheral (CAP) to Host Device connection and disconnection, wherein access of specific content is halted upon disconnection of the CAP and wherein the web-browser used to access the specific content is running on the host device.
Figure 5B:
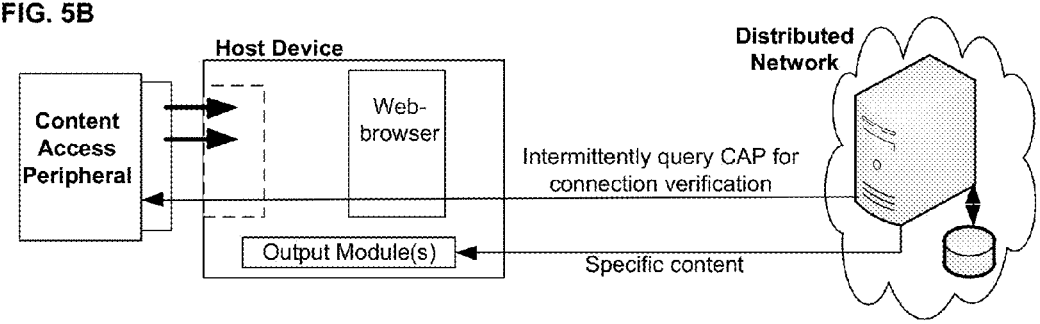
Figure 5C:
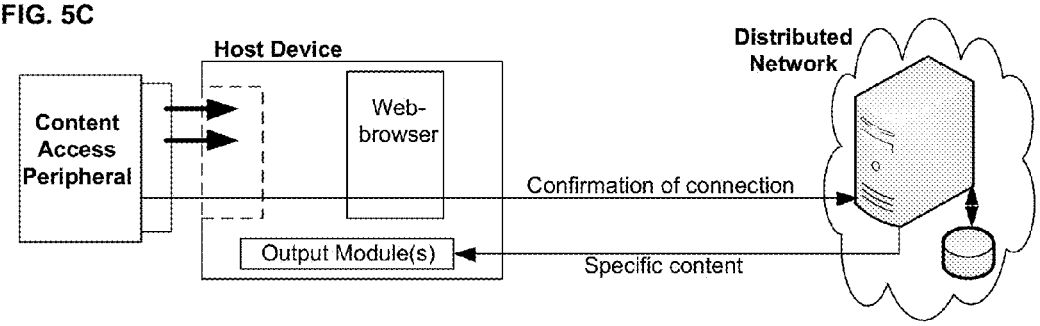
Figure 5D:
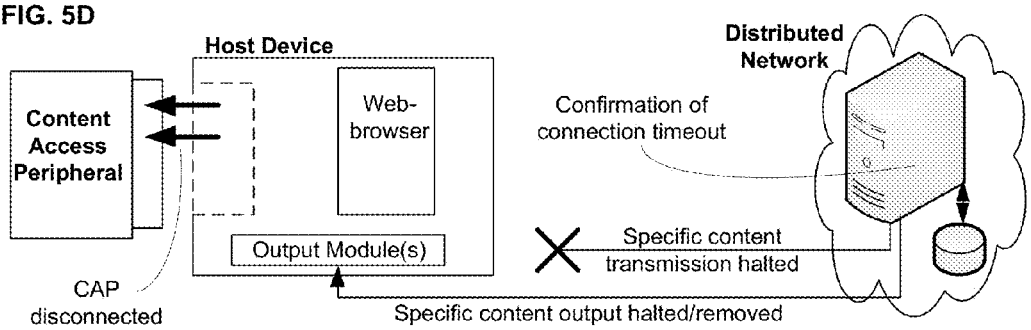

In FIG. 4 there is shown, in accordance with some embodiments of the present invention, a CAP device accessing specific content associated with its first and/or second identifier (s). Each time the CAP connects to the specific network address (e.g. the specific network address as defined by the first CAP identifier) information relating to the user/object/product associated with the CAP (e.g. based on the CAP's second identifier) may be collected by the accessed server. Furthermore, information relating to the location and time of connection may be collected from the host device (e.g. host IP and host clock read). Accordingly, tracking and usage data—associated with specific CAPs or CAP users—may be kept on a database functionally associated with the accessed server, and later used for analyzing various parameters of specific content access habits.

In FIGS. 5A-5D there are shown, in accordance with some embodiments of the present invention, an exemplary CAP disconnection scheme. Upon connection to a host the CAP may launch the host's web-browser, direct/point the web-browser to a specific network address, transmit the second identifier to the specific network address and receive specific content associated with the second identifier 5A.

The server at the specific network address may intermittently query the CAP for connection verification (e.g. by looking up for specific data known to it, at specific addresses of the CAPs NVM) 5B. The server may maintain transmission of specific content, associated with the CAP's second identifier, to the host device as long as confirmations of connection (e.g. specific data known to server from specific addresses of the CAPs NVM is sent back to querying server) are received 5C. If a CAP connection confirmation is not received at the server for a certain amount of time, a confirmation of connection timeout may occur causing the server to halt the specific content transmission to the host device and/or halt/remove the output of the specific content on host device output module(s) (e.g. now present to the browser a blank page) 5D.

Figure 6A:
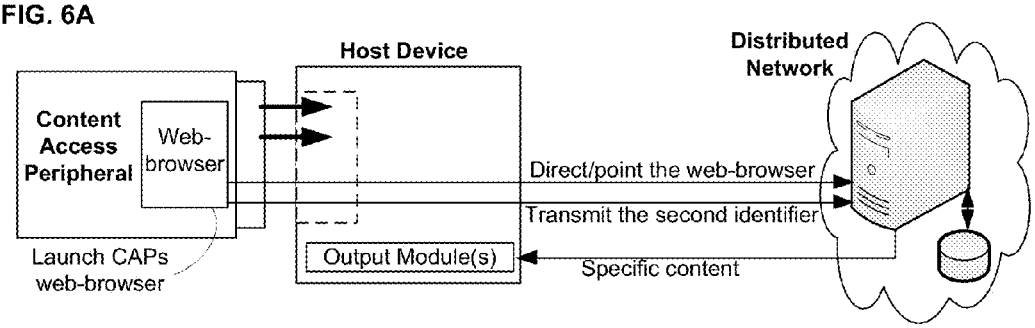
In FIGS. 6A-6C there are shown, in accordance with some embodiments of the present invention, exemplary stages of a content-associated Content Access Peripheral (CAP) to Host Device connection and disconnection, wherein access of specific content is halted upon disconnection of the CAP and wherein the web-browser used to access the specific content is running on the CAP; and In FIGS. 7A-7D there are shown, in accordance with some embodiments of the present invention, the stages of a Content Access Peripheral (CAP) to Specific Content association (1.1, 1.2 . . . ) and of using the associated CAP to access Specific Content (2.1, 2.2 . . . ), as part of 4 different exemplary CAP applications, wherein 7A is a medical clinic related example, 7B is a bank related example, 7C is a home improvement store related example, and 7D is a lottery/sweepstake game related example.
Figure 6B:
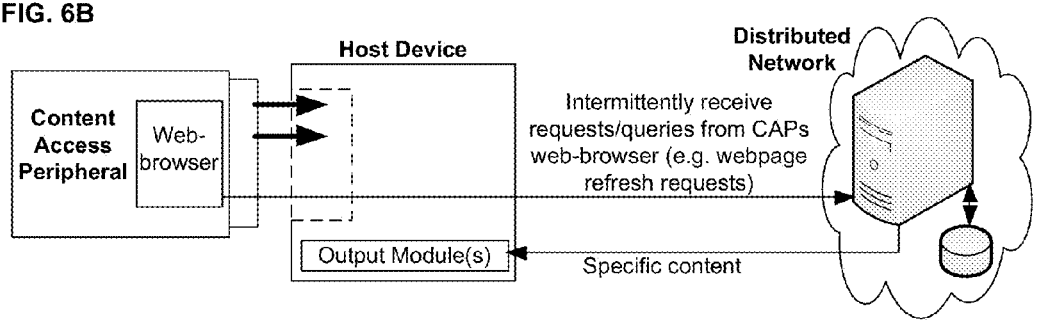
Figure 6C:
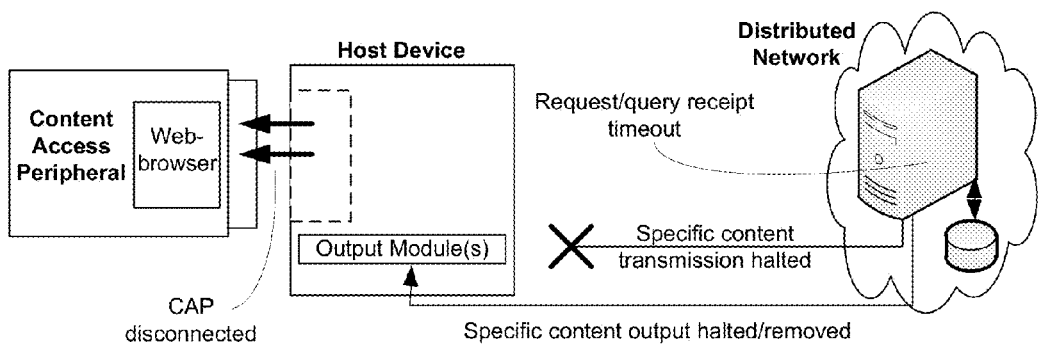

In FIGS. 6A-6C there are shown, in accordance with some embodiments of the present invention, an exemplary CAP disconnection scheme of a web-browser comprising CAP. Upon connection to a host the CAP may launch the its web-browser, direct/point the web-browser to a specific network address, transmit the second identifier to the specific network address and receive specific content associated with the second identifier 6A.

The server at the specific network address may intermittently receive requests/queries from the CAP's web-browser (e.g. page refresh requests) 6B. The server may maintain transmission of specific content, associated with the CAP's second identifier, to the host device as long as requests/queries from the CAP's web-browser are intermittently received. If a CAP's web-browser request/query is not received at the server for a certain amount of time, a confirmation of connection timeout may occur causing the server to halt the specific content transmission to the host device and/or halt/remove the output of the specific content on host device output module(s) (e.g. now present to the browser a blank page) 6C.

In FIGS. 7A-7D there are shown, in accordance with some embodiments of the present invention, examples of a CAP device initiation/paring process (steps 1.1, 1.2 . . . ) and an initiated/paired CAP device based specific content access process (steps 2.1, 2.2 . . . )—in four different exemplary applications. These examples show the utilization of a second identifier which was prewritten to the CAP's NVM, however, substantially similar applications may also be implemented by utilizing a second identifier generated as part of the CAP's initiation/pairing process.

Figure 7A:
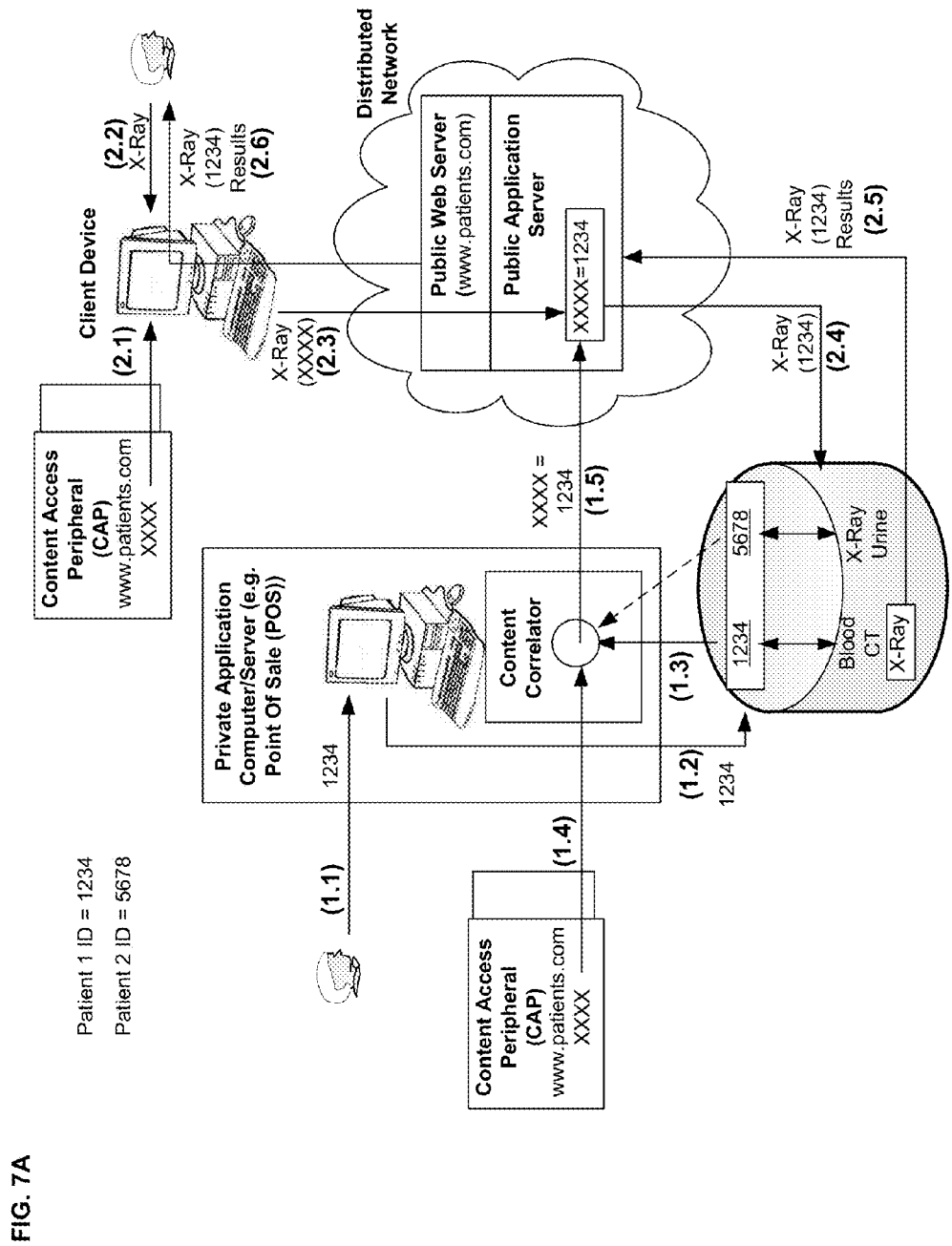

In FIG. 7A there is shown, in accordance with some embodiments of the present invention, an exemplary medical clinic application wherein: a patient of the clinic is asked for his ID which is fed into the clinic's POS computer (1.1). The POS computer may then query a patient database (local or remote DB) for the patient's ID, once found in the database, or opened as a new record if the patient is new (1.2), the patient's ID may be sent back to the POS computer content cotrrelator (1.3) and communicated, along with the second identifier read from the same patient's CAP (1.4), to a public web/application server (1.5).

The patient may now access his specific content by connecting the CAP to a client host device (2.1) causing the client host device's browser to be directed/pointed to the public web/application server at the network address written to the CAP as the first identifier, and communicate to the public web/application server the CAP's second identifier and possibly additional data entered by the patient (e.g. the medical test in which the patient is interested (2.2.)) (2.3). Based on pairs of patient IDs to CAP second identifiers, communicated to the server as part of patient CAPs initiation/pairing process, the server may find the second identifier of the currently connected CAP, find the patient ID paired to it and use that patient's ID to access the content associated with that specific patient (2.4). The server may also limit/filter the content accessed based on one or more requests made by the patient (e.g. present X-ray results and not CT or Blood test results). The patient's specific content may then be communicated to the server (2.5) where it may be presented to the patient's web-browser and thus to the patient himself (2.6) using one or more output means of the client host device.

Figure 7B:
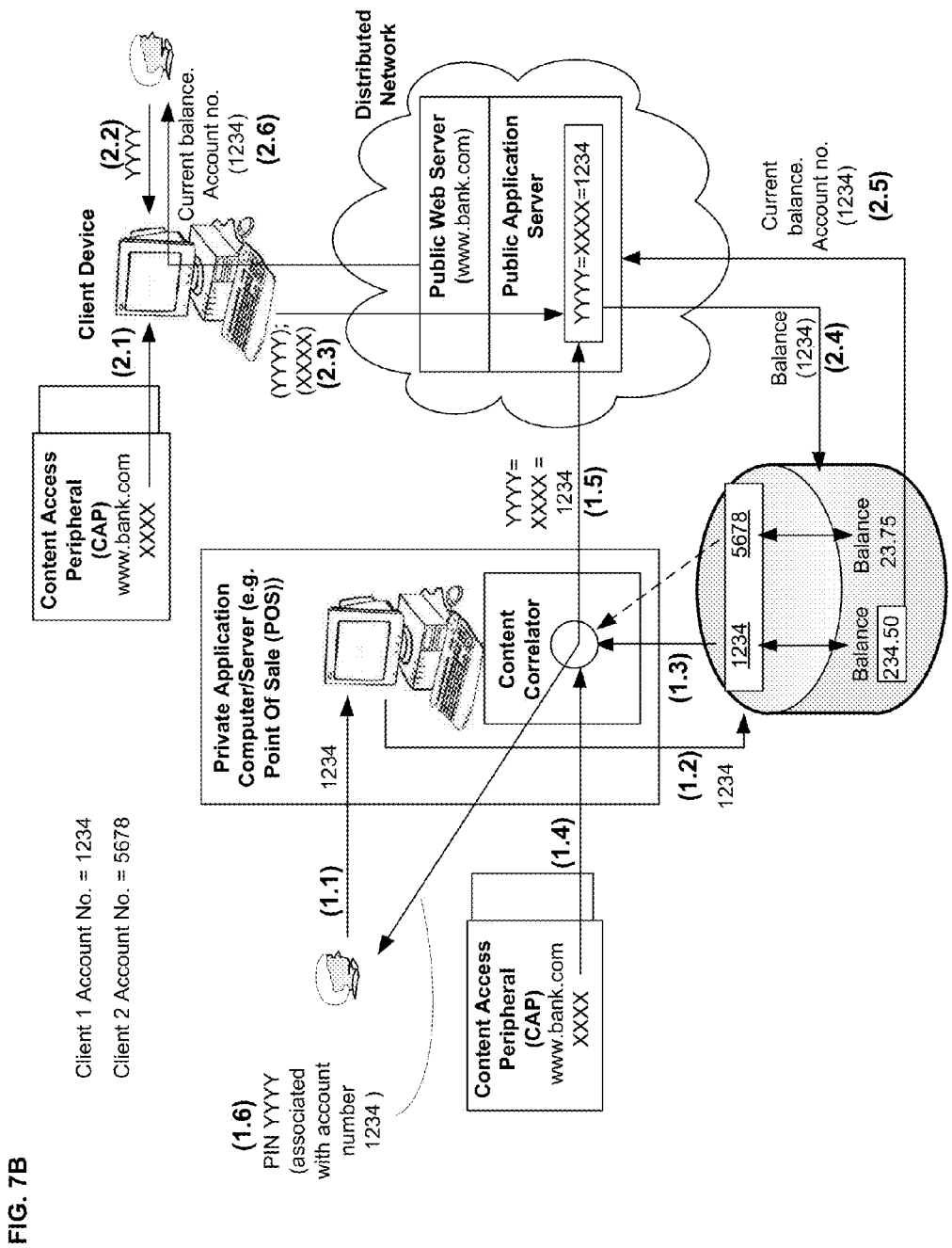

In FIG. 7B there is shown, in accordance with some embodiments of the present invention, an exemplary bank application wherein: a client of the bank is asked for his account number which is fed into the bank's POS computer (1.1). The POS computer may then query a client database (local or remote DB) for the client's account number, once found in the database, or opened as a new record if the account is new (1.2), the client's ID may be sent back to the POS computer content cotrrelator (1.3) and communicated, along with the second identifier read from the same client's CAP (1.4) and possibly an associated PIN code, to a public web/application server (1.5). The PIN code may also be given to the account holding client (1.6).

The client may now access his specific content by connecting the CAP to a client host device (2.1) causing the client host device's browser to be directed/pointed to the public web/application server at the network address written to the CAP as the first identifier, and communicate to the public web/application server the CAP's second identifier and possibly additional data entered by the client (e.g. the PIN code associated with the account (2.2)) (2.3). Based on pairs of client account numbers to CAP second identifiers, communicated to the server as part of client CAPs initiation/pairing process, the server may find the second identifier of the currently connected CAP, find the client account number paired to it and use that client's account number to access the content associated with that specific patient (2.4) (e.g. the current balance in the account). The server may only allow access to the account related content if the right PIN code corresponding to the CAP second identifier and the account number has been correctly entered and communicated to it. The client account specific content may then be communicated to the server (2.5) where it may be presented to the client's web-browser and thus to the client himself (2.6) using one or more output means of the client host device.

Figure 7C:
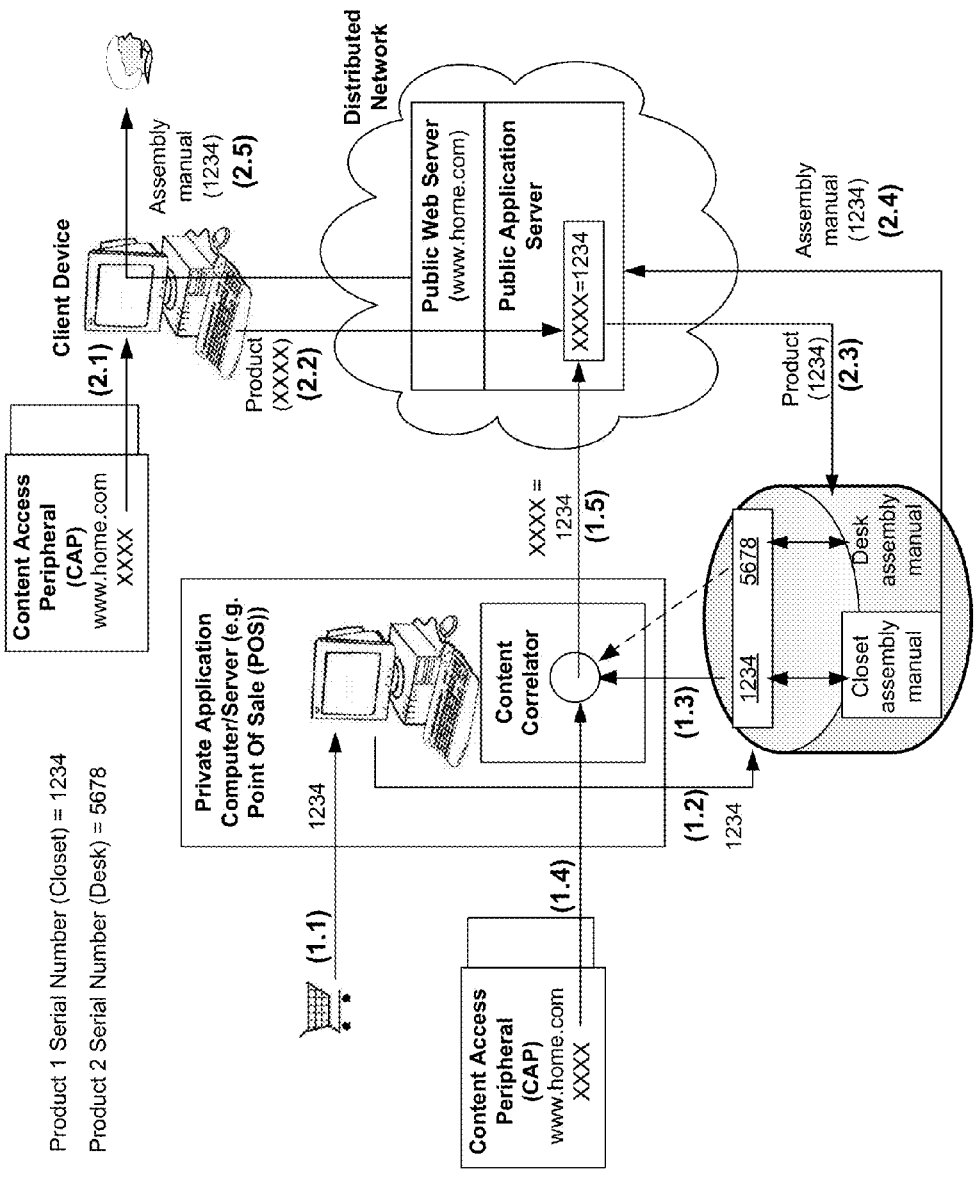

In FIG. 7C there is shown, in accordance with some embodiments of the present invention, an exemplary home furniture store application wherein: a serial number of a product bought by a client of the store is fed into the store's POS computer (1.1). The POS computer may then query a product database (local or remote DB) for the product's serial number, once found in the database, or opened as a new record if the product is new (1.2), the product's serial number may be sent back to the POS computer content cotrrelator (1.3) and communicated, along with the second identifier read from the same client's CAP (1.4), to a public web/application server (1.5).

The client may now access his specific content (e.g. the product assembly manual) by connecting the CAP to a client host device (2.1) causing the client host device's browser to be directed/pointed to the public web/application server at the network address written to the CAP as the first identifier, and communicate to the public web/application server the CAP's second identifier (2.2). Based on pairs of product serial numbers to CAP second identifiers, communicated to the server as part of client CAPs initiation/pairing process, the server may find the second identifier of the currently connected CAP, find the product serial number paired to it and use that product serial number to access the content associated with that specific product (2.3). The product's specific content (e.g. product assembly manual) may then be communicated to the server (2.4) where it may be presented to the client's web-browser and thus to the client himself (2.5) using one or more output means of the client host device.

In FIG. 7D there is shown, in accordance with some embodiments of the present invention, an exemplary lottery application wherein: a lottery card number, of a lottery card bought by a client, is fed into the lottery's POS computer (1.1). The POS computer may then communicate to a previously-issued (i.e. participating) lottery cards' numbers database (local or remote DB) the current lottery card's number (1.2), the lottery card number may be sent back to the POS computer content correlator (1.3) and communicated, along with the second identifier read from the card buying client's CAP (1.4), to a public web/application server (1.5). Playing (i.e. bought) lottery card numbers may be communicated to a lottery computer/server (1.6) adapted to select the winning card numbers (e.g. by randomly selecting a predetermined number of winning numbers from all participating numbers) and communicate the winning card numbers back to the POS computer database (1.7).

The client may now access his lottery card specific content (e.g. whether his card is a winning or a losing card) by connecting the CAP to a client host device (2.1) causing the client host device's browser to be directed/pointed to the public web/application server at the network address written to the CAP as the first identifier, and communicate to the public web/application server the CAP's second identifier (2.2). Based on pairs of lottery card numbers to CAP second identifiers, communicated to the server as part of client CAPs initiation/pairing process, the server may find the second identifier of the currently connected CAP, find the lottery card number paired to it and use that lottery card number to access the content associated with that specific card (2.3). The lottery card specific content (e.g. 'YOU WIN' or 'YOU LOOSE' message) may then be communicated to the server (2.4) where it may be presented to the client's web-browser and thus to the client himself (2.5) using one or more output means of the client host device.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for correlating a Content Access Peripheral (CAP) to Online Content, said system comprising:
   one or more CAPs including Non Volatile Memory (NVM) containing a first identifier;
   a CAP to content correlator having a network address associated with the first identifier and comprising processing circuitry adapted to correlate a second identifier with a set of content parameters associated with a given CAP of the one or more CAPs;
   a point of sale apparatus comprising:
   a. CAP interface circuitry adapted to interface with a first CAP of the one or more of CAPs;
   b. first receiving circuitry adapted to receive from the first CAP the first identifier;
   c. transmission circuitry adapted to communicatively connect to said content correlator based on said first identifier and transmit to said content correlator one or more content parameters associated with content to be associated with the first CAP; and
   d. second receiving circuitry adapted to receive from said content correlator a second identifier correlated by said content correlator to said one or more content parameters; and
   e. a CAP writing module adapted to write the second identifier upon the NVM of the first CAP;
   a content server adapted to serve, over a distributed data network, user specific content;
   wherein,
   i. said content correlator is further adapted to forward to said content server the one or more content parameters in correlation with the second identifier;
   ii. said content server is further adapted to generate user specific content, based on the one or more content parameters, and associate the generated user specific content with the second identifier; and
   iii. said first cap is adapted to, upon being connected to a host computing device, automatically: (1) cause the host device to instance a web browser of the host computing device, (2) cause the browser to contact said content server, (2) cause the browser to communicate the second identifier to the content server, (3) cause the browser to receive the generated user specific content from the content server and (4) cause the browser to provide the generated user specific content upon the host device.

2. The system according to claim 1 wherein the one or more content parameters are associated with details of a specific commercial transaction performed at said point of sale apparatus.

3. The system according to claim 1, wherein said content correlator is further adapted to generate a PIN (Personal Identification Number) code in association with a second identifier associated with a given set of content parameters and send the generated PIN along with the second identifier to said point of sale apparatus.

4. The system according to claim 1 wherein the first identifier is a network address.

5. The system according to claim 4 wherein a combination of the first and second identifiers is a network address.

6. The apparatus according to claim 1 wherein the one or more content parameters are selected from a set including at least the following: a user ID, a product serial number, a lottery card number and a bank account number.

7. The system according to claim 1, wherein the first CAP is further adapted to, while being connected to a host device, reply to queries made by the content server, wherein failing to reply to a query causes the content server to discontinue access to the generated user specific content.

8. A point of sale computational apparatus for correlating a Content Access Peripheral (CAP) to Online Content, said apparatus comprising:
   transactional circuitry adapted to facilitate a retail transaction;
   a user interface adapted to receive, from a user, content parameters relating to the retail transaction;
   CAP interface circuitry adapted to interface with a first CAP containing a first identifier;
   first receiving circuitry adapted to receive from the first CAP the first identifier stored on a Non Volatile Memory (NVM) portion of the interfaced CAP;
   transmission circuitry adapted to communicatively connect, based on the first identifier, to a content correlator and transmit to the content correlator the received content parameters;
   second receiving circuitry adapted to receive from the content correlator a second identifier correlated by the content correlator to the transmitted content parameters; and
   a CAP writing module adapted to write the second identifier upon the NVM of the first CAP
   wherein the first CAP, once the second identifier has been written upon it, upon being connected to a host device, will automatically: (1) cause the host device to instance a web browser of the host computing device, (2) cause the browser to contact a content server, (2) cause the browser to communicate the second identifier to the content server, (3) cause the browser to receive from the content server user specific content generated based on the transmitted content parameters and (4) cause the browser to provide the generated user specific content upon the host device.

9. The apparatus according to claim 8 further comprising a receipt module adapted to receive from the content correlator an acknowledgment of association of the second identifier with the transmitted content parameters.

10. The apparatus according to claim 8, further adapted to receive a PIN (Personal Identification Number) code, wherein the PIN code is usable for access to the generated user specific content.

11. The apparatus according to claim 8 wherein the content parameters are selected from a set including at least the following: a user ID, a product serial number, a lottery card number and a bank account number.

12. A method for correlating a Content Access Peripheral (CAP) to Online Content comprising:
   interfacing, by a point of sale computing apparatus, with a first CAP of a set of CAPs comprising one or more CAPs including Non Volatile Memory (NVM) containing a first identifier;
   reading the first identifier from the first CAP;
   transmitting, from the point of sale computing apparatus, to a content correlator associated with the first identifier one or more content parameters relating to a commercial transaction to be associated with the first CAP;
   correlating, by the content correlator, a second identifier to the one or more content parameters;
   transmitting, from the content correlator, the content parameters with the second identifier, to a content server;
   receiving at the point of sale apparatus, from the content correlator, the second identifier;
   generating, by the content server, user specific content, based on the one or more content parameters, and associating the generated user specific content with the second identifier;
   and
   writing, by the point of sale computing apparatus, the second identifier upon the first CAP;
   wherein the first CAP, once the second identifier has been written upon it, upon being connected to a host device, will automatically: (1) cause the host device to instance a web browser of the host computing device, (2) cause the browser to contact the content server, (2) cause the browser to communicate the second identifier to the content server, (3) cause the browser to receive the generated user specific content, and (4) cause the browser to provide the generated user specific content upon the host device.

13. The method according to claim 12, further comprising:
   correlating, by the content correlator, a PIN (Personal Identification Number) code to the second identifier;
   transmitting the PIN code to the point of sale apparatus; and
   communicating the PIN code to a customer of the commercial transaction.

14. The method according to claim 12 wherein the first identifier is a network address.

15. The method according to claim 12 wherein a combination of the first and second identifiers is a network address.

16. The method according to claim 12 wherein the one or more selected from a set including at least the following: a user ID, a product serial number, a lottery card number and a bank account number.

17. The method according to claim 12, further comprising sending queries from the content server to the host device and discontinuing access to the generated user specific content in the event that the host device does not reply properly to the queries, wherein the appropriate response to the queries is contained in the first CAP.

18. A method for correlating a Content Access Peripheral (CAP) to Online Content comprising:
   interfacing, by a point of sale computing apparatus, with a first CAP of a set of CAPs comprising one or more CAPs including Non Volatile Memory (NVM) containing: (1) a common first identifier, which first identifier is common to all the one or more caps and (2) an individual second identifier, which second identifier is unique in each of the one or more CAPs;
   reading the first and second identifiers from the first CAP;
   transmitting, from the point of sale computing apparatus, to a content correlator associated with the first identifier the second identifier and one or more content parameters relating to a retail purchase to be associated with the first CAP;
   correlating, by the content correlator, the second identifier to the one or more content parameters;
   transmitting, from the content correlator, the content parameters with the second identifier, to a content server; and
   generating, by the content server, user specific content, based on the one or more content parameters, and associating the generated user specific content with the second identifier;
   wherein the first CAP, upon being connected to a host device, will automatically: (1) cause the host device to instance a web browser of the host computing device, (2) cause the browser to contact the content server, (2) cause the browser to communicate the second identifier to the content server, (3) cause the browser to receive the generated user specific content, and (4) cause the browser to provide the generated user specific content upon the host device.

19. The method according to claim 18 further comprising receiving from the content server an acknowledgment of association of the second identifier and the generated user specific content.

20. The method according to claim 18 further comprising:
   correlating, by the content correlator, a PIN (Personal Identification Number) code to the second identifier;
   transmitting the PIN code to the point of sale apparatus; and
   communicating the PIN code to a customer of the commercial transaction.

21. The method according to claim 18 wherein the one or more content parameters are selected from a set including at least the following: a user ID, a product serial number, a lottery card number and a bank account number.

22. A system for correlating a Content Access Peripheral (CAP) to online content, said system comprising:
   one or more CAPs including Non Volatile Memory (NVM), wherein data stored on said NVM comprises at least: (1) a first identifier, which first identifier is common to all the one or more caps, and (2) an individual second identifier, which second identifier is unique in each of the one or more CAPs;
   a CAP to content correlator having a network address associated with the common first identifier and comprising processing circuitry adapted to correlate a given second identifier contained on a given CAP with a set of content parameters associated with the given CAP;
   a point of sale computing apparatus comprising:
   a. CAP interface circuitry adapted to interface with a CAP of the one or more of CAPs;

b. first receiving circuitry adapted to receive from the first CAP the first and second identifiers contained in the first CAP;
c. transmission circuitry adapted to communicatively connect to said content correlator, based on said first identifier, and transmit to said content correlator the second identifier received from the first CAP and one or more content parameters associated with content to be associated with the first CAP;

a content server adapted to serve, over a distributed data network, user specific content;

wherein i. said content correlator is further adapted to forward to said content server the one or more content parameters in correlation with the second identifier;
ii. said content server is further adapted to generate user specific content, based on the one or more content parameters, and associate the generated user specific content with the second identifier; and
iii. said first CAP is adapted, upon being connected to a host computing device, to: (1) cause the host device to instance a web browser, (2) cause the browser to contact the content server, (2) cause the browser to communicate the second identifier to the content server, (3) cause the browser to receive the generated user specific content, and (4) cause the browser to provide the generated user specific content upon the host device.

23. The CAP according to claim 22 wherein the control logic is further adapted to cause the web-browser to present the online content associated with the second identifier on at least one output module of the interfaced host.

24. The system according to claim 22 wherein the first CAP is further adapted to intermittently reply to queries made by the content server, wherein failing to reply to a query causes the content server to discontinue access to the generated user specific content.

25. The CAP according to claim 24 wherein the web-browser application is stored on the host device.

26. The system according to claim 22 wherein the web-browser stored on the first CAP's NVM.

* * * * *